United States Patent
Yasuhara et al.

(10) Patent No.: US 7,401,814 B2
(45) Date of Patent: Jul. 22, 2008

(54) STEERING DEVICE SUPPORT STRUCTURE

(75) Inventors: Kanji Yasuhara, Fuchu-cho (JP); Kouki Makino, Fuchu-cho (JP); Hisashi Ogino, Fuchu-cho (JP); Toshihiro Matsuoka, Fuchu-cho (JP); Kiyohito Obara, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 104 days.

(21) Appl. No.: 11/348,371

(22) Filed: Feb. 7, 2006

(65) Prior Publication Data

US 2006/0186658 A1    Aug. 24, 2006

(30) Foreign Application Priority Data

Feb. 21, 2005  (JP)  ............... 2005-043421
Feb. 21, 2005  (JP)  ............... 2005-043422
Feb. 21, 2005  (JP)  ............... 2005-043423

(51) Int. Cl.
   *B62D 1/18* (2006.01)
(52) U.S. Cl. ..................... 280/775
(58) Field of Classification Search .............. 280/775, 280/777, 779
   See application file for complete search history.

(56) References Cited

U.S. PATENT DOCUMENTS

| | | | |
|---|---|---|---|
| 4,022,495 A | | 5/1977 | Pizzocri |
| 5,409,261 A | * | 4/1995 | Yamaguchi .............. 280/775 |
| 6,357,317 B1 | * | 3/2002 | Livengood et al. ........... 74/493 |
| 6,474,189 B1 | * | 11/2002 | Koellisch et al. ........... 74/493 |
| 6,543,807 B2 | * | 4/2003 | Fujiu et al. .............. 280/775 |

(Continued)

FOREIGN PATENT DOCUMENTS

DE         3433936         3/1986

(Continued)

OTHER PUBLICATIONS

European Search Report Application No. EP 06 00 2653 dated May 5, 2006.

*Primary Examiner*—Faye M. Fleming
(74) *Attorney, Agent, or Firm*—Studebaker & Brackett PC; Donald R. Studebaker

(57) ABSTRACT

Disclosed a structure for supporting a steering device including a steering shaft 9 adapted to transmit a steering force of a steering wheel to road wheels, relative to a vehicle body through an instrument-panel member 6 extending a lateral direction of a vehicle. The support structure comprises a first bracket 20 fixed to the instrument-panel member 6, a steering column 19 rotatably mounting the steering shaft 9, a second bracket 21, 22 fixed to the steering column 19, and coupling means 23, 24 for providing a coupling between the first bracket 20 and the second bracket 21, 22. The coupling means 23, 24 is designed to allow the second bracket 21, 22 to have an axial relative displacement with respect to the first bracket 20 on the basis of an axial direction of the steering shaft 9 while allowing an upward relative displacement of the second bracket 21, 22 with respect to the first bracket 20 in the course of the axial relative displacement, during a vehicle collision. The support structure of the present invention makes it possible to displace a steering shaft upward during a vehicle collision so as to prevent the knee of a passenger from interfering with the steering shaft, while ensuring a steering operation by a passenger, in a simplified structure.

12 Claims, 25 Drawing Sheets

U.S. PATENT DOCUMENTS

| | | | |
|---|---|---|---|
| 6,824,166 B2 * | 11/2004 | Peel | 280/775 |
| 6,829,962 B2 * | 12/2004 | Cartwright | 74/493 |
| 6,862,947 B2 * | 3/2005 | Cooper et al. | 74/493 |
| 6,923,086 B2 * | 8/2005 | Muller | 74/493 |
| 6,981,430 B2 * | 1/2006 | Murakami et al. | 74/493 |
| 7,011,340 B2 * | 3/2006 | Tsuji et al. | 280/775 |
| 2002/0024208 A1 * | 2/2002 | Fujiu et al | 280/775 |
| 2002/0140219 A1 * | 10/2002 | Tsunoda et al. | 280/779 |
| 2003/0094063 A1 * | 5/2003 | Cooper et al. | 74/493 |
| 2004/0104565 A1 * | 6/2004 | Tsuji et al. | 280/775 |

FOREIGN PATENT DOCUMENTS

| | | |
|---|---|---|
| JP | 2000006819 | 1/2000 |
| JP | 2000225953 | 8/2000 |
| JP | 2002059853 | 2/2002 |
| JP | 2003-40080 | 2/2003 |
| JP | 2003040080 | 2/2003 |

* cited by examiner

STEERING DEVICE SUPPORT STRUCTURE

BACKGROUND OF THE INVENTION

1. Field of the Invention

This invention relates to a structure for supporting, relative to a vehicle body through an instrument panel, a steering device including a steering shaft adapted to transmit a steering force of a steering wheel to road wheels.

2. Description of the Background Art

Generally, the above steering shaft is arranged to pass by a space just below an instrument-panel member extending in a width or lateral direction of a vehicle, and rotatably mounted within a steering column.

When a driver sits in a driver seat, the knee of the driver (passenger) is located adjacent to a steering shaft. Thus, there is the need for providing a structure allowing the driver's knee to be kept from interfering with the steering shaft in the event of a vehicle collision.

Japanese Patent Laid-Open Publication No. 2003-40080 (Patent Publication 1) discloses a steering lock device intended to reduce an impact during a vehicle collision at a given level or less so as to ensure passenger's safety.

Specifically, in a steering lock device includes a tubular casing body housing a key cylinder adapted to be rotationally operated by a key, a lock support member extending from the casing body toward a steering shaft and having a tubular guide portion, and a lock member disposed in the lock support member to extend along the guide portion and adapted to be moved between a lock position where the lock member is engaged with the steering shaft according to the rotational operation of the key and a release position where the engagement is released, the above steering lock device comprises an anchor portion formed in the lock support member to allow the steering lock device to be fixed to a vehicle body, and a breakage-inducing portion formed in a connection portion between the casing body and the lock support member to induce a breakage of the connection portion in response to a given impact force, whereby in the event of a vehicle collision, the connection portion is broken to allow the casing body to be rotated upward about the lock support member so as to reduce a load to be imposed on the knee of a passenger and reduce an impact to the passenger at a given level or less.

The Patent Publication 1 includes no description about a specific structure and a technical concept allowing the steering shaft itself to be displaced upward during the vehicle collision.

SUMMARY OF THE INVENTION

In view of the above circumstances, it is an object of the present invention to provide a steering device support structure capable of displacing a steering shaft upward in the event of a vehicle collision to prevent the knee of a passenger from interfering with the steering shaft, while ensuring a steering operation by a passenger, in a simplified structure.

In order to achieve the above object, the present invention provides a structure for supporting a steering device including a steering shaft adapted to transmit a steering force of a steering wheel to road wheels, relative to a vehicle body through an instrument-panel member extending a lateral direction of a vehicle. The structure comprises a first bracket fixed to the instrument-panel member, a steering column rotatably mounting the steering shaft, a second bracket fixed to the steering column, and coupling means for providing a coupling between the first and second brackets. The coupling means is designed to allow the second bracket to have an axial relative displacement with respect to the first bracket on the basis of an axial direction of the steering shaft while allowing an upward relative displacement of the second bracket with respect to the first bracket in the course of the axial relative displacement, during a vehicle collision.

In the above structure of the present invention, the coupling means is operable, in a normal state, to couple the first and second brackets together, and, in the event of a vehicle collision, to allow the second bracket to have the axial relative displacement while displacing the second bracket upward in the course of the axial relative displacement. Thus, the steering shaft can be displaced upward during the vehicle collision while ensuring a steering operation by a passenger in the normal state. This makes it possible to prevent the knee of the passenger from interfering with the steering shaft during the vehicle collision.

These and other objects, features and advantages of the present invention will become apparent upon reading of the following detailed description along with the accompanied drawings.

DESCRIPTION OF THE PREFERRED EMBODIMENTS

In order to achieve the object of preventing the knee of a passenger from interfering with a steering shaft while ensuring a steering operation by a passenger, in a simplified structure, a structure for supporting a steering device including a steering shaft adapted to transmit a steering force of a steering wheel to road wheels, relative to a vehicle body through an instrument-panel member extending a lateral direction of a vehicle, comprises a first bracket fixed to the instrument-panel member, a steering column rotatably mounting the steering shaft, a second bracket fixed to the steering column, and coupling means for providing a coupling between the first and second brackets. The coupling means is designed to allow the second bracket to have an axial relative displacement with respect to the first bracket on the basis of an axial direction of the steering shaft while allowing an upward relative displacement of the second bracket with respect to the first bracket in the course of the axial relative displacement, during a vehicle collision.

With reference to the drawings, various embodiment of the present invention will now be described.

Figure 1:
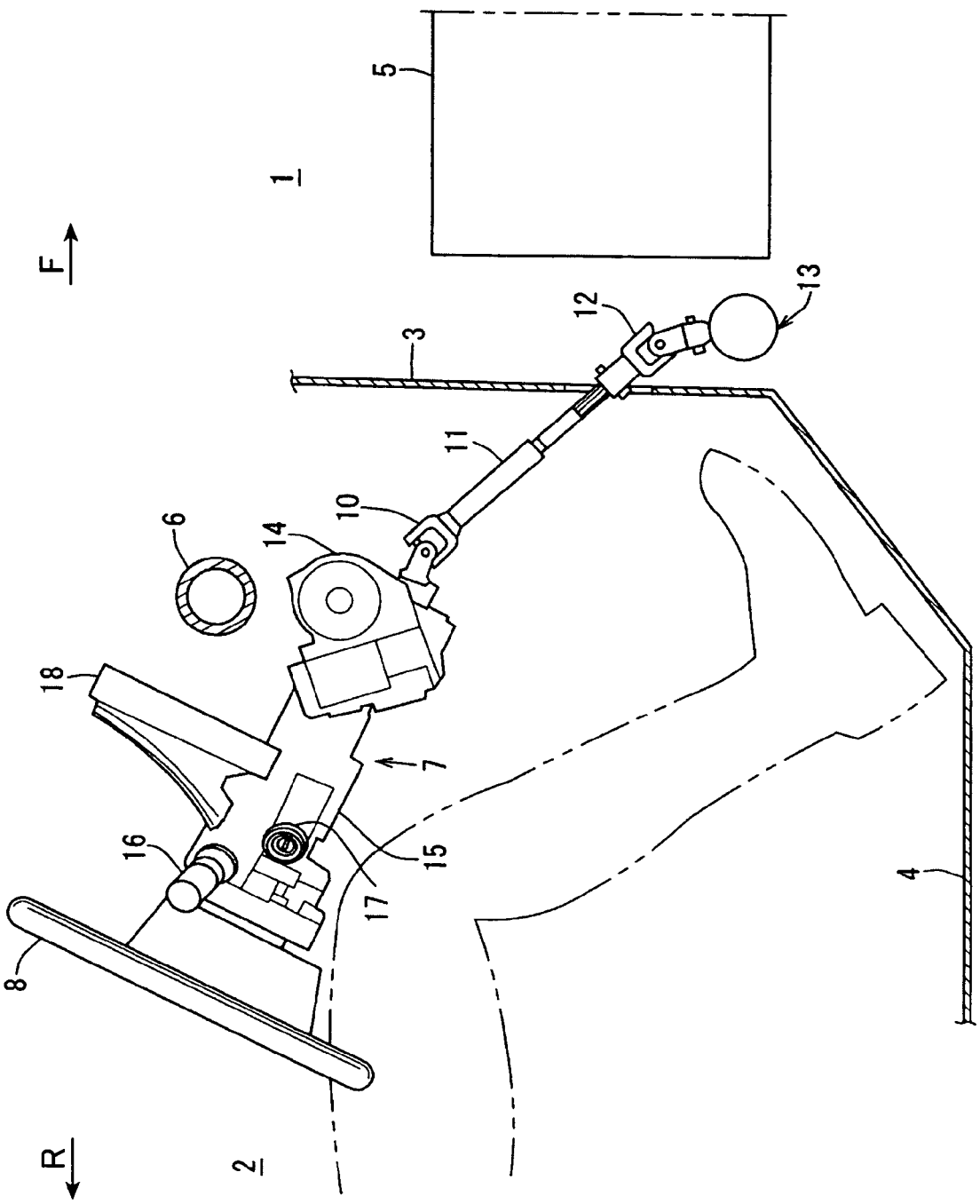
FIG. 1 is a schematic right side view showing a steering device support structure according to a first embodiment of the present invention.
Figure 2:
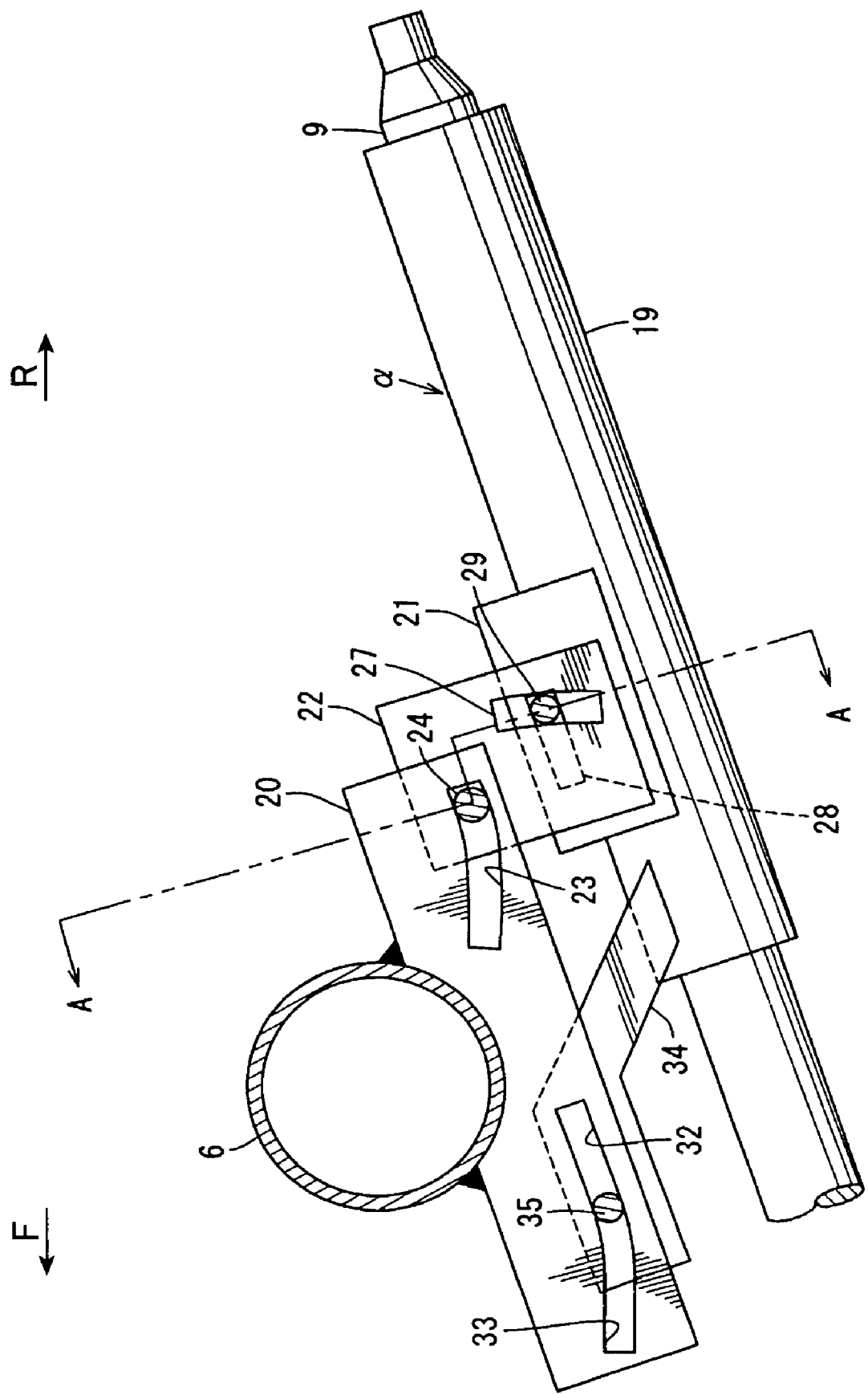
FIG. 2 is a left side view showing the steering device support structure.

FIG. 1 is a schematic right side view showing a steering device support structure according to a first embodiment of the present invention, and FIG. 2 is a left side view showing a substantial part of the steering device support structure. A dash lower panel 3 is disposed between an engine compartment 1 and a passenger compartment 2 of a vehicle to partition therebetween. A floor panel 4 extends rearward from a lower edge of the dash lower panel 3 approximately horizontally.

An engine 5 is mounted in the engine compartment 1. An instrument-panel member 6 extends in a width or lateral direction of the vehicle to bridge between closed-sectional right and left hinge pillars (not shown), and a steering device 7 is supported by the instrument-panel member 6.

This steering device 7 includes a steering shaft 9 (see FIG. 2) adapted to transmit a steering force of a steering wheel 8 to read wheels, and designed to transmit a turning force of the steering shaft 9 to a steering gear unit 13 mounted on the side of the engine compartment 1, through an upper universal joint 12, a second shaft 11, a lower universal joint 12.

The steering device 7 has an electric power steering unit 14. A blinker lever 16 and a key cylinder are arranged in a column cover section 15, and a gauge panel 18 is disposed in adjacent relation to and above the column cover section 15.

As shown in FIG. 2, the steering shaft 9 is disposed in a rear-high/front-low slanted arrangement so as to pass by a space just below the instrument-panel member 6 in a frontward/rearward or longitudinal direction of the vehicle. The steering shaft 9 rotatably mounted within a steering column 19.

Figure 3:
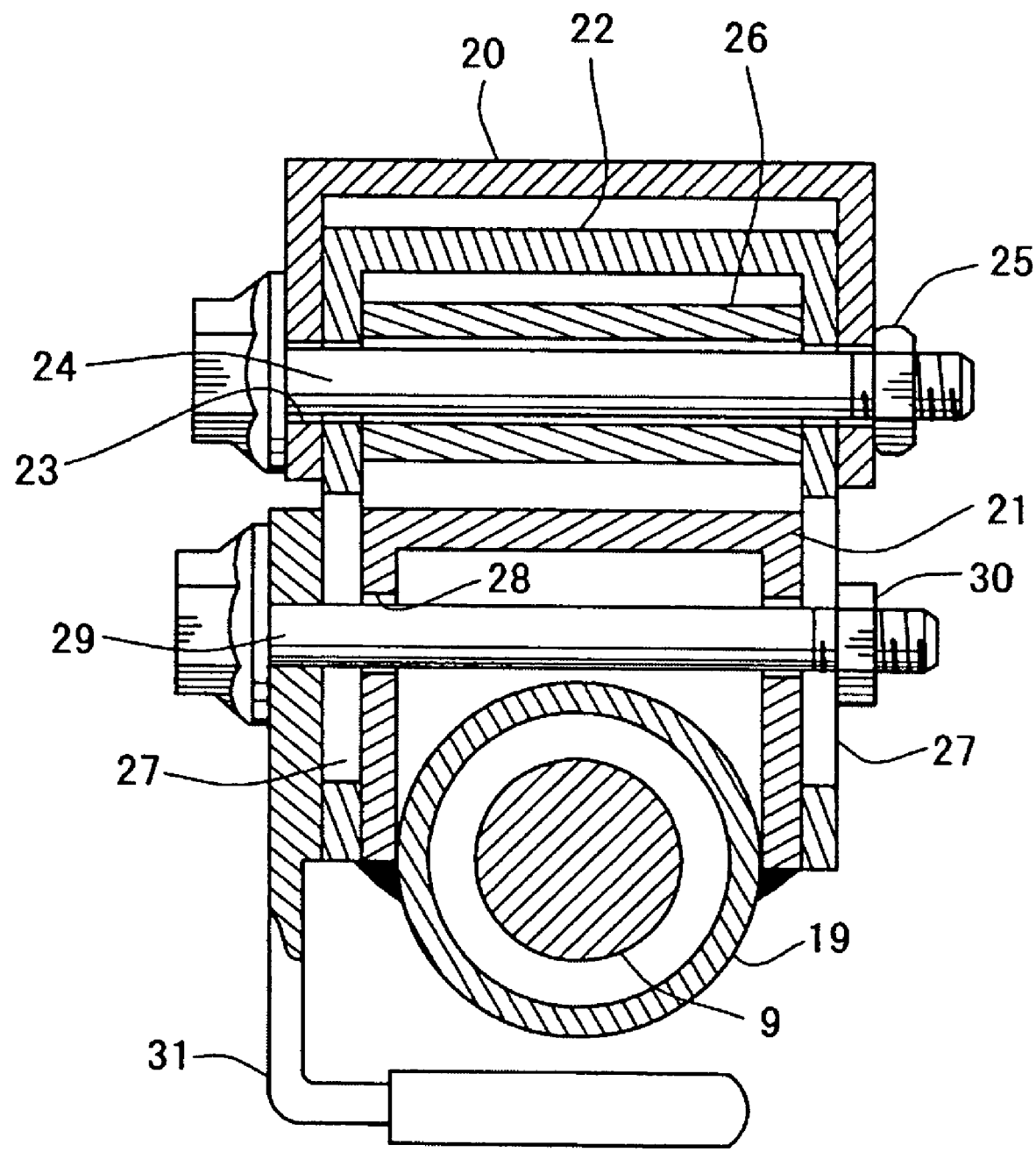
FIG. 3 is a sectional view taken along the line A-A in FIG. 2.

FIG. 3 is a sectional view taken along the line A-A in FIG. 2. The steering device support structure is designed as illustrated in FIGS. 2 and 3.

Specifically, a first bracket 20 having a gate-like shape in section is fixed to a lower portion of the instrument-panel member 6, and an inner bracket 21 having a gate-like shape in section is fixed to the steering column 19. An outer bracket 22 having a gate-like shape in section is disposed in contact with respective outer surfaces of laterally-opposite sidewalls of the inner bracket 21 and in contact with respective inner surfaces of laterally-opposite sidewalls of the first bracket 20. A combination of the inner bracket 21 and the outer bracket 22 serves as a second bracket.

Each of the inner bracket 21 and the outer bracket 22 is located rearward relative to a portion of the instrument-panel member 6 having the first bracket 20 fixed thereto. A pair of right and left guide grooves 23 are formed, respectively, in regions of the laterally-opposed sidewalls of the first bracket 20, each of which is in opposed relation to the outer bracket 22. The first bracket 20 and the outer bracket 22 located inside the first bracket 10 are coupled together by a bolt 24 which is attached thereto to extend between respective rear end regions of the right and left guide grooves 23 so as to serve as a coupling member. A nut 25 is threadingly fastened to a distal end of the bolt 24. The bolt 24 is attached in such a manner as to be slidably moved relative to the guide grooves 23 during a vehicle collision.

The bolt 24 extends in the lateral direction of the vehicle, and a collar 26 is attached around a stem of the bolt 24 to extend between the respective inner surfaces of laterally-opposite sidewalls of the outer bracket 22

A pair of right and left tilt-adjustment grooves 27 are formed, respectively, in regions of the sidewalls of the outer bracket 22, each of which is in opposed relation to the inner bracket 21. Each of the tilt-adjustment grooves 27 extends vertically in an arc form. Further, a pair of right and left telescopic-adjustment grooves 28 are formed, respective, in regions of the sidewalls of the inner bracket 21, each of which is in opposed relation to the outer bracket 22. Each of the telescopic-adjustment grooves 28 extends in the longitudinal direction of the vehicle.

The outer bracket 22 and the inner bracket 21 located inside the outer bracket 22 are coupled together by a bolt 29 attached to extend between respective right and left grooves 27, 28, and a nut 30 is threadingly fastened to a distal end of the bolt 29. A telescopic-adjustment lever 31 is sandwiched between an outer surface of one of the sidewalls of the outer bracket 22 and an inner surface of a head of the bolt 29.

A pair of right and left telescopic-adjustment grooves 32 are formed, respectively, in regions of the sidewalls of the first bracket 20, each of which is located frontward relative to the instrument-panel member 6. Each of the telescopic-adjustment grooves 32 extends in the longitudinal direction of the vehicle. A front end (front side) of the telescopic-adjustment grooves 32 is extended frontward to form a guide groove 33 for guiding the steering shaft 9 axially and upward during a vehicle collision.

The steering column 19 has a column bracket 34 fixed thereto and formed to extend up to the grooves 32, 33. The first bracket 20 and the column bracket 34 are coupled together by a tilt-center shaft 35 disposed to extend laterally between the right and left telescopic-adjustment grooves 32. The tilt-center shaft 35 is fixed to the column bracket 34.

When the lever 31 is manually operated, the bolt 29 inserted through the tilt-adjustment grooves 27 and the telescopic-adjustment grooves 28 is designed to be movable relative to either one of the pairs of grooves 27, 28.

Figure 4:
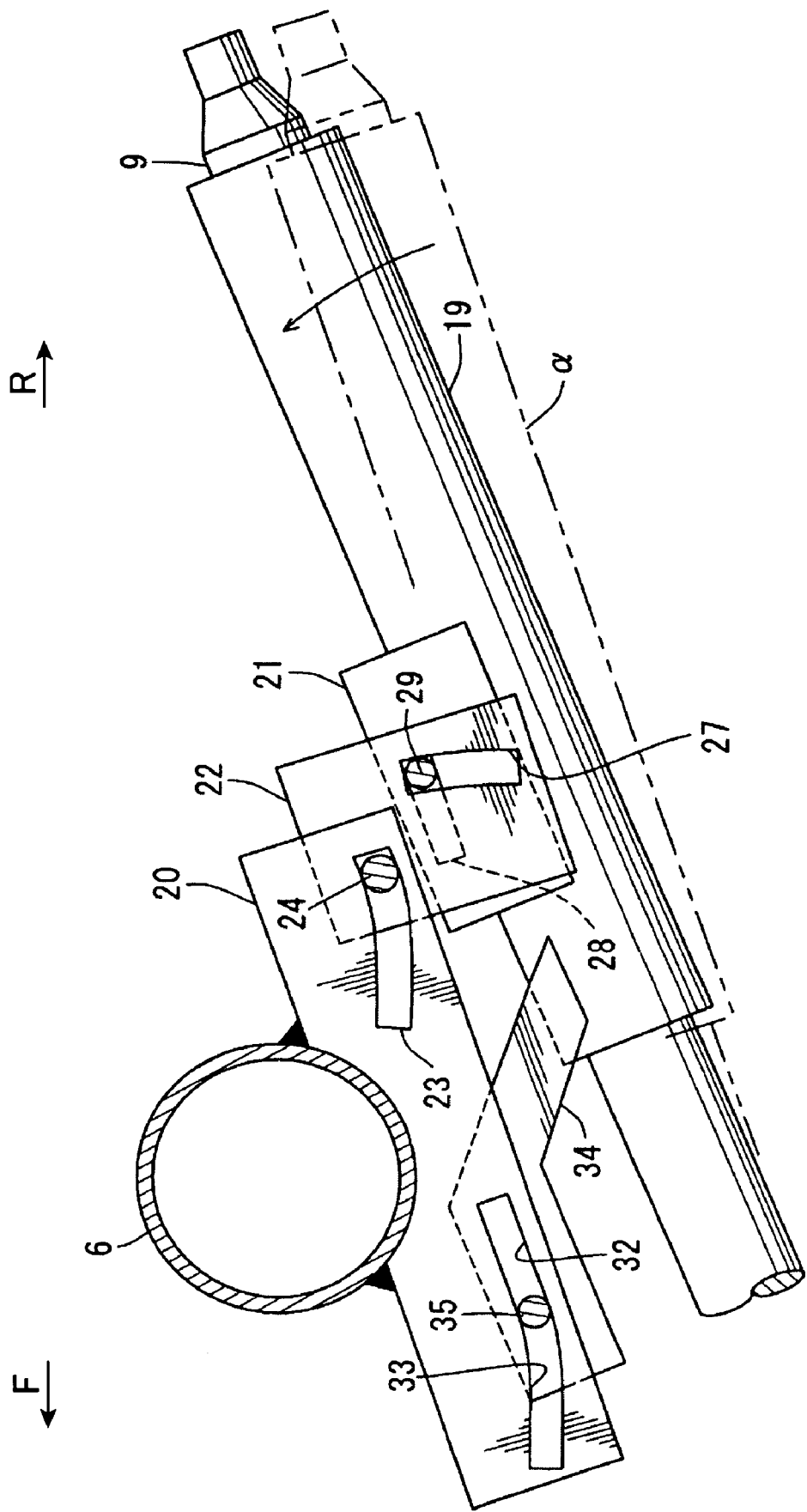
FIG. 4 is an explanatory left side view showing a tilt movement of a steering shaft of the steering device support structure.

Specifically, when a fastening force of the bolt 29 and the nut 30 is reduced and then the steering column 10 is tilted from a normal position a (a normal running state) as shown in FIG. 2 about the tilt-center shaft 35, the bolt 29 is displaced along the tilt-adjustment grooves 27 to allow the steering shaft 9 to be tilted to a position, as indicated by the solid line in FIG. 4.

Figure 5:
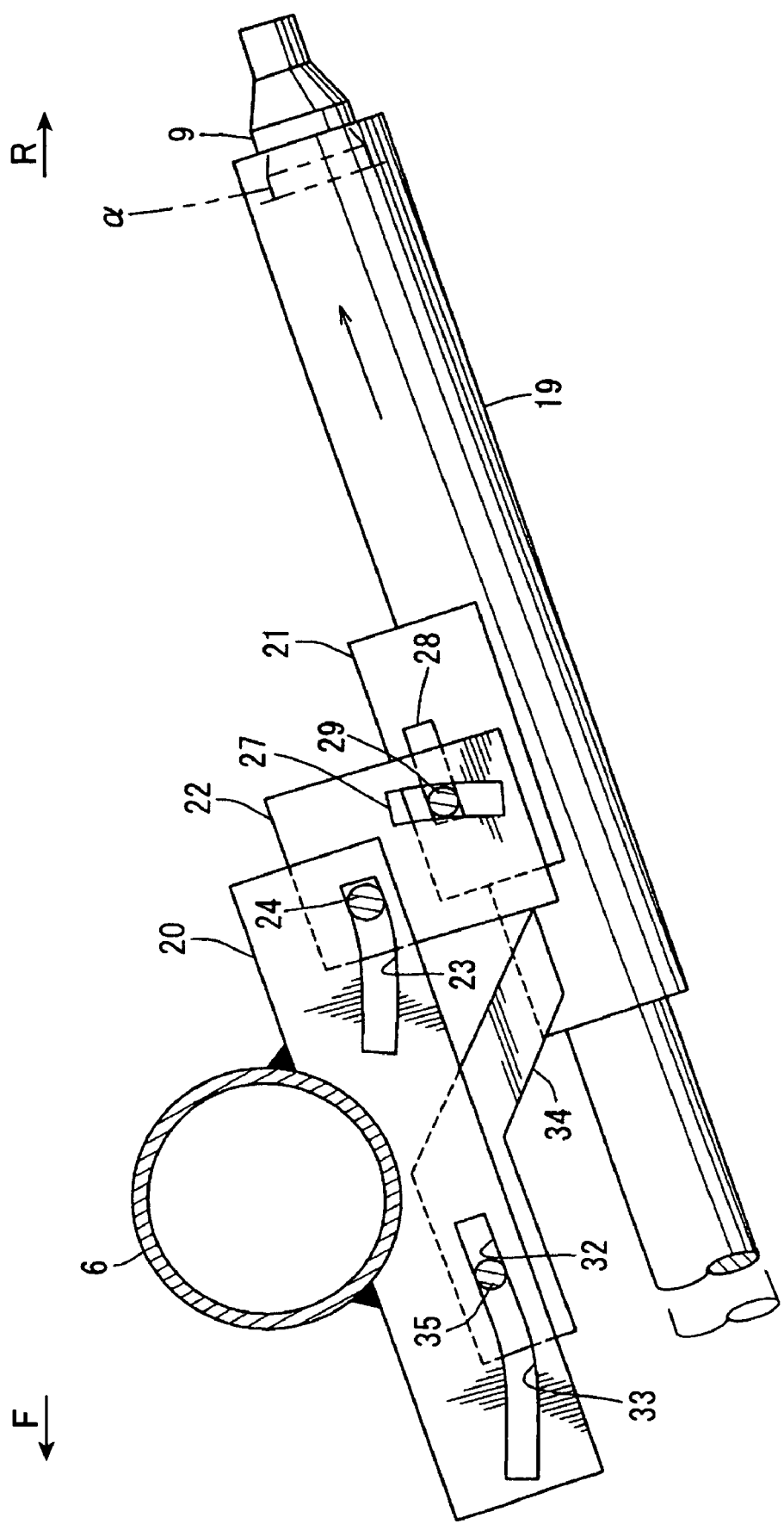
FIG. 5 is an explanatory left side view showing a telescopic movement of the steering shaft.

Further, when the fastening force of the bolt 29 and the nut 30 is reduced and then the steering column 10 is telescopically moved from the normal position a as shown in FIG. 2, the grooves 28 of the inner bracket 21 is displaced along the bolt 29 and simultaneously the tilt-center shaft 35 integral with the column bracket 34 is displaced along the grooves 32 to allow a longitudinal position of the steering shaft 9 to be adjusted, as indicated by the solid line in FIG. 5.

Each of the guide grooves 23 is formed in an arc shape extending upward in a front region thereof on the basis of an axial direction of the steering shaft 9. This guide groove 23 is formed in the same shape as that of each of the guide groove 33.

A combination of the guide grooves 23 and the bolt 24 serves as coupling means for coupling the first bracket 20 and the second bracket (outer bracket 22, inner bracket 21). This coupling means is designed to allow the outer bracket 22 to have an axial relative displacement with respect to the first bracket 20 on the basis of the axial direction of the steering shaft 9, while allowing an upward relative displacement of the outer bracket 22 with respect to the first bracket 20 in the course of the axial relative displacement, during a vehicle collision.

Figure 6:
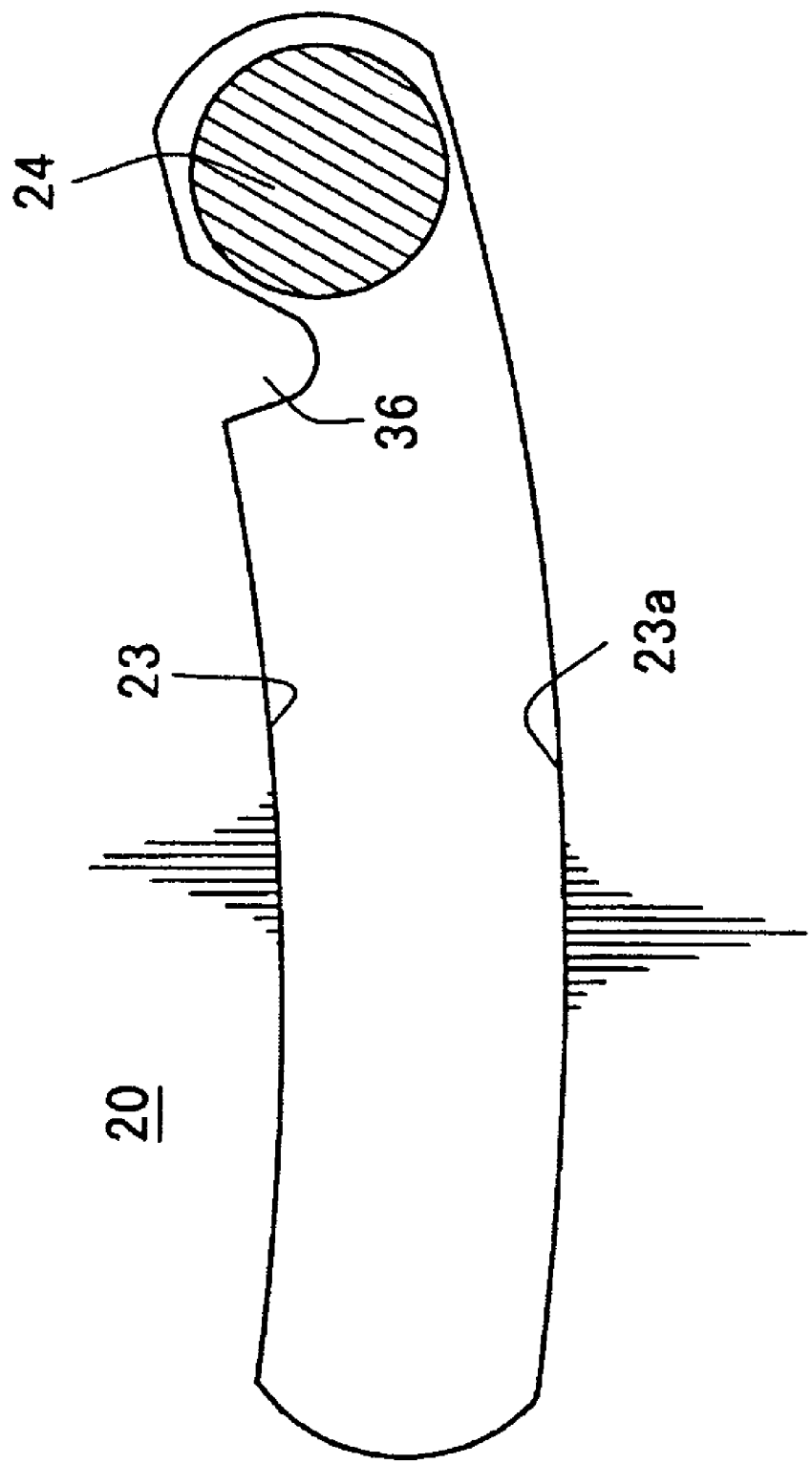
FIG. 6 is an enlarged side view showing a guide groove in the steering device support structure.

Referring to FIG. 6 which is an enlarged view showing the detailed structure of the guide groove 23 illustrated in FIG. 2, the guide groove 23 has a tongue 36 serves as a breakable protrusion which is disposed in the guide groove 23 and adapted to inhibit the relative displacements of the second bracket (the outer bracket 22 and the inner bracket 21) with respect to the first bracket 20, i.e. the relative displacements of the bolt 24, in a normal state (non-collision state), and to be broken by the bolt 24 during a vehicle collision so as to permit the relative displacements.

In the guide grove illustrated in FIG. 6, the tongue 36 protrudes downward from an upper edge of the guide groove 23 to hold the bolt 24, which is in the normal position or located in a rear end region of the guide groove 23, only from an upper side of the guide groove 23.

In the above steering device support structure, in the event of a frontal impact collision, the engine 5 is moved rearward, and the upper body of a passenger set in a driver seat is moved frontward. While an airbag housed in the steering wheel 8 is inflated to receive the upper body of the passenger, a load is imposed the steering shaft 9 at a given value causing an axially frontward movement of the steering shaft 9, or more.

This load is transmitted to the bolt 24 serving as the coupling member through the steering shaft 9, the steering column 19, the inner bracket 21 and the outer bracket 22. Thus, in response the road transmitted to the bolt 24, the bolt 24 is moved to break the tongue 36, and then guided frontward and upward along a lower guide surface 23a of the guide groove 23.

Figure 7:
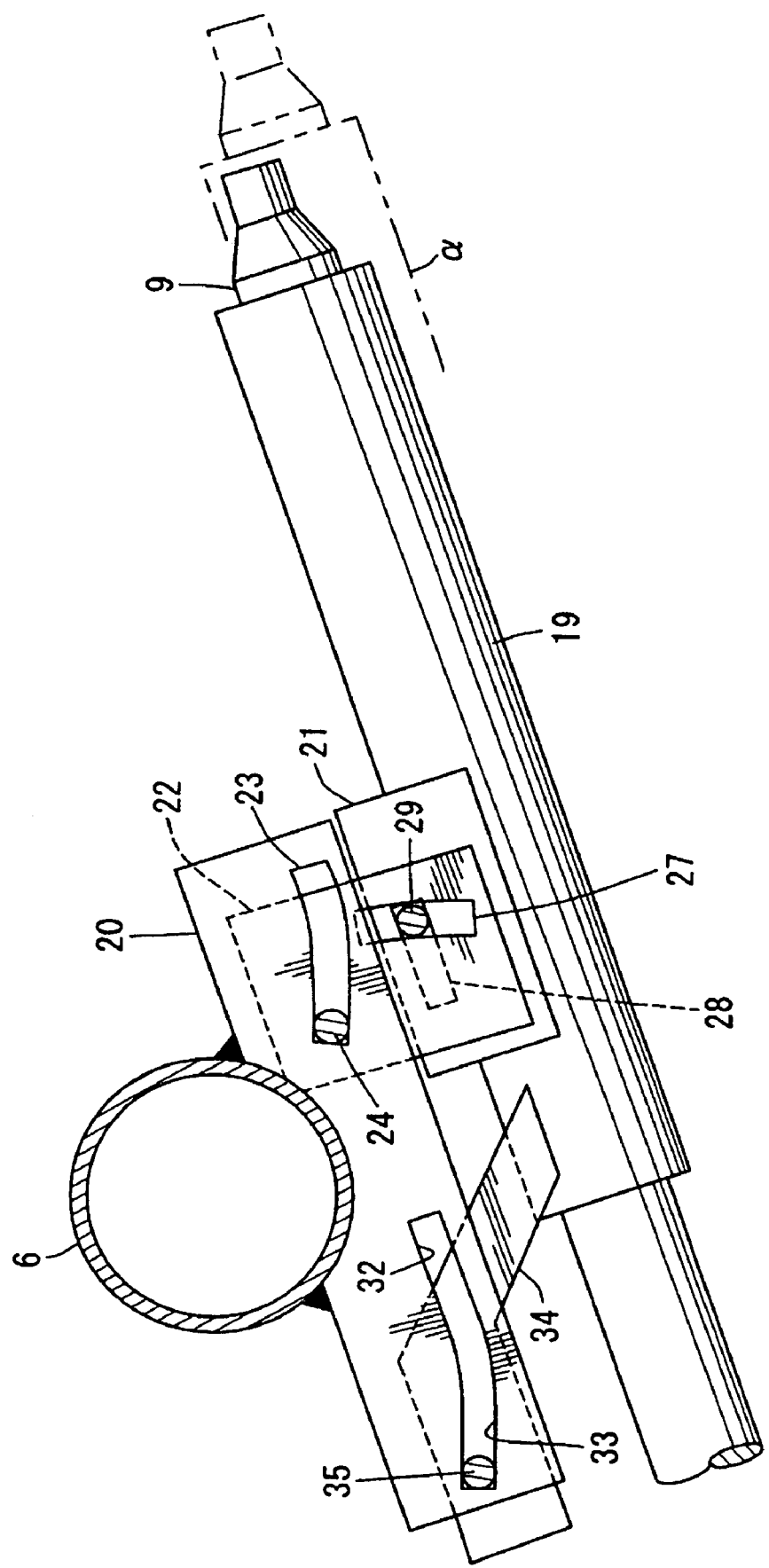
FIG. 7 is an explanatory left side view showing a displacement of the steering shaft during a vehicle collision.

In concurrence with the frontward and upward movement of the bolt 24, the tilt-center shaft 35 is guided frontward and upward along the guide groove 33, and thereby the steering shaft 9 is moved frontward and upward from the normal position illustrated in FIG. 2, as indicated by the solid line in FIG. 7. This makes it possible to prevent the knee of the passenger from interfering with the steering shaft 9 during the vehicle collision.

As above, the steering device support structure according to the first embodiment illustrated in FIGS. 1 to 7 is designed as follows: the structure for supporting the steering device including the steering shaft 9 adapted to transmit a steering force of the steering wheel 8 to road wheels, relative to a vehicle body through the instrument-panel member 6 extending a lateral direction of the vehicle, comprises the first bracket 20 fixed to the instrument-panel member 6, the steering column 19 rotatably mounting the steering shaft 9, the second bracket (brackets 21, 22) fixed to the steering column 19, and the coupling means (bolt 24) for providing a coupling between the first bracket 20 and the second bracket. The coupling means (bolt 24) is designed to allow the second bracket (brackets 21, 22) to have an axial relative displacement with respect to the first bracket 10 on the basis of an axial direction of the steering shaft 9 while allowing an upward relative displacement of the second bracket (brackets 21, 22) with respect to the first bracket 20 in the course of the axial relative displacement, during a vehicle collision.

In the above structure according the first embodiment, the bolt 24 serving as the coupling means is operable, in a normal state, to couple the first bracket 20 and the second bracket (brackets 21, 22) together, and, in the event of a vehicle collision, to allow the second bracket (brackets 21, 22) to have the axial relative displacement while displacing the second bracket (brackets 21, 22) upward in the course of the axial relative displacement. Thus, the steering shaft 9 can be displaced upward as shown in FIG. 7 during the vehicle collision while ensuring a steering operation by a passenger in the normal state (see FIG. 2). This makes it possible to prevent the knee of the passenger from interfering with the steering shaft 9 during the vehicle collision.

Further, the coupling means include the guide groove 23 formed in either one of the first bracket 20 and the second bracket to extend upward in a front region thereof on the basis of an axial direction of the steering shaft 9, and the bolt 24 serving as the coupling member slidably supported by the guide groove 23 to couple the first and second bracket together, wherein the guide groove 23 has the breakable protrusion (tongue 36) disposed therein and adapted to inhibit the relative displacements in a normal state and to be broken (fracture, rupture, buckling, bending, flexure, etc.) by the coupling member (bolt 24) during a vehicle collision so as to permit the relative displacements.

This structure can satisfy both of the needs to ensure a rigidity for supporting the steering shaft 9, in the normal state, and to permit the relative displacements of the second bracket during the vehicle collision.

Specifically, the coupling member (bolt 24) can be reliably held by the tongue 36 serving as the breakable protrusion when a load is applied thereto at a given value or less, and can reliably break the tongue 36 serving as the breakable protrusion when a load is applied thereto at a value of greater than the given value, so as to permit the relative displacements. The guide groove 23 having the front region formed to extend upward allows the steering shaft 9 to be reliably displaced upward.

The breakable protrusion (tongue 36) is formed to hold the coupling member (bolt 24) only from an upper side of the guide groove 23.

According to this structure, the lower guide surface 23a of the guide groove 23 is not deformed during the vehicle collision. This makes it possible to protect the lower guide surface 23a so as to ensure a smooth movement of the coupling member (bolt 24) during the vehicle collision.

The first and second brackets (the brackets 20, 21) are formed, respectively, with the telescopic-adjustment grooves 28, 32, and the telescopic-adjustment groove 32 of the first bracket 20 is extended frontward to form the guide groove 33 for guiding the steering shaft 9 axially and upward during a vehicle collision.

According to this structure, the guide groove 33 can be formed using the telescopic-adjustment groove 32. Further, the telescopic-adjustment grooves 28, 32 formed in both the first bracket 20 and the second bracket (the bracket 21) allow the steering column 19 or the steering shaft 9 to be stably supported relative to the instrument-panel member 6.

Further, the second bracket (the bracket 22) is formed with the tilt-adjustment groove 27 for a tilt movement of the steering shaft 9 about the tilt-center shaft 35 disposed on a frontward side of the vehicle relative to a portion of the first bracket 20 associated with the coupling means (bolt 24 in the normal position).

According to this structure, the above effects of the present invention can be obtained in a steering system equipped with a tilt mechanism. That is, the advantage of being able to displace the steering shaft 9 upward during a vehicle collision while ensuring a steering operation by a passenger in a normal state can be obtained.

Figure 8:
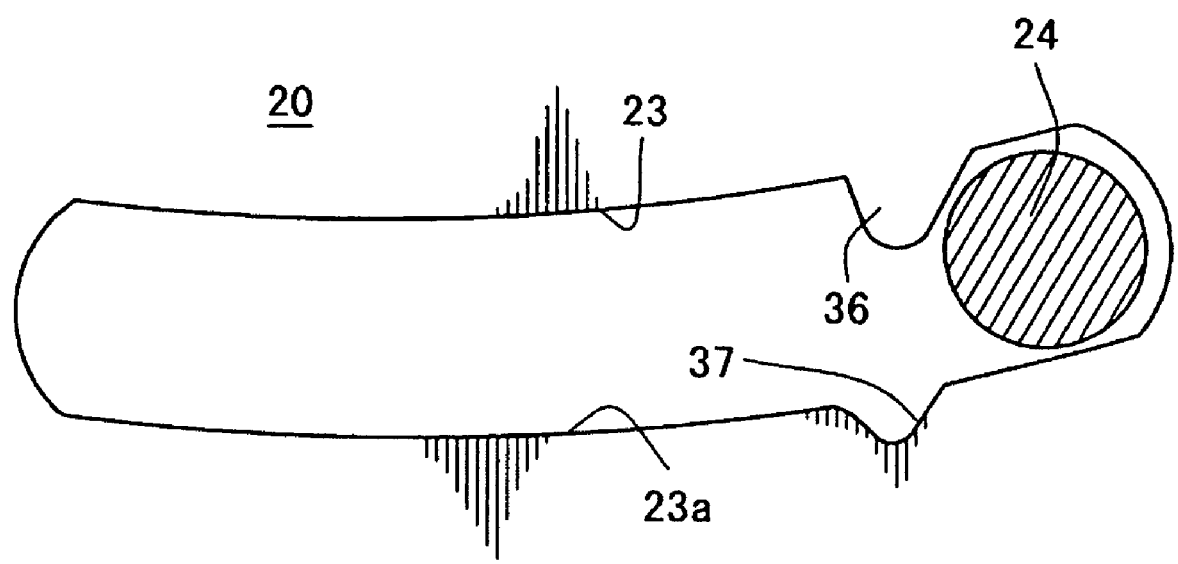
FIG. 8 is an explanatory enlarged side view showing one example of modification of the guide groove.

FIG. 8 shows one example of modification of the guide groove. In addition to the structure of the guide groove in FIG. 6, a guide groove 23 illustrated in FIG. 8 has a depression 37 formed in a lower edge thereof at a position opposed to the tongue 36. In this the guide groove, the bolt 24 serving as the coupling member can be reliably held by the tongue 36 when a load is applied thereto at a given value or less. Further, when a load is applied thereto at a value of greater than the given value during a vehicle collision, the bolt 24 can reliably break the tongue 36, and the depression 37 allows the bolt 24 to be smoothly moved.

Other structure, functions and effects are substantially the same as those in the first embodiment illustrated in FIGS. 1 to 7. Thus, in FIG. 8, the same component or element is defined by the same reference numeral in FIGS. 1 to 7, and their detailed description will be omitted.

FIG. 9 shows another example of modification of the guide groove. A guide groove 23 illustrated in FIG. 9 has an upper tongue 38 and a lower tongue 39 which serve as the breakable protrusion adapted hold the bolt 24 serving as the coupling member, from both upper and lower sides of the guide groove 23. The upper tongue 38 and the lower tongue 39 are formed to protrude, respectively, from upper and lower edges of the guide groove 23 toward an inner space of the groove. Further, the upper and lower tongues 38, 39 are formed to be different in rigidity for holding the bolt 24.

Figure 9A:
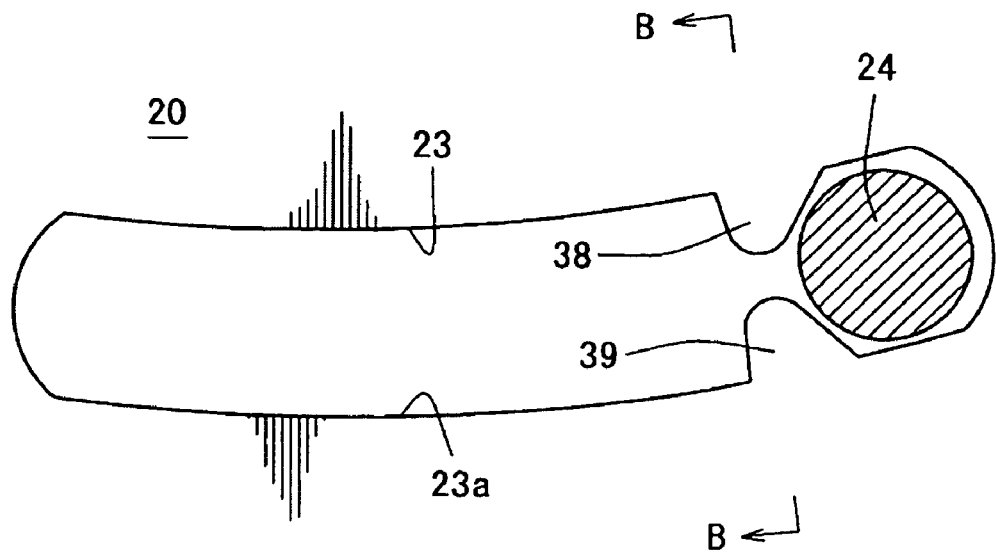
FIG. 9 is an explanatory enlarged side view showing another example of modification of the guide groove.
Figure 9B:
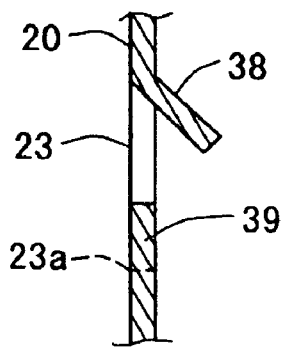
Figure 9C:
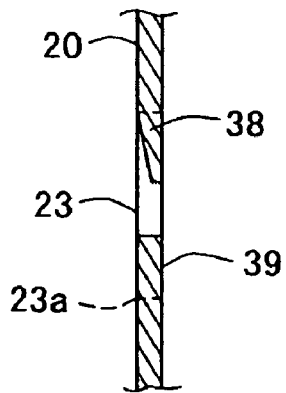

FIG. 9(A) is an enlarged side view showing the guide groove 23, and FIGS. 9(B) and 9(C) are sectional views showing two types of tongues, taken along the line B-B in FIG. 9(A). In the guide groove 23 illustrated in FIG. 9(B), the upper tongue 38 is formed in a bended shape to serve as an easily-deformable low-rigidity portion, and the lower tongue 39 is formed in a non-bended shape.

In the guide groove 23 illustrated in FIG. 9(C), the upper tongue 38 is reduced in thickness to serve as an easily-deformable low-rigidity portion, and the lower tongue 39 is formed to have the same thickness as that of the first bracket 20 or a relatively large thickness.

As above, in the guide groove illustrated in FIG. 9, the breakable protrusion includes the upper and lower breakable protrusions (the upper tongue 38 and the lower tongue 39) which are formed to hold the coupling member (bolt 24) from both upper and lower sides of the guide groove 23, and the upper and lower breakable protrusions (the tongues 38, 39) are formed to be different in rigidity for holding the coupling member (bolt 24).

According to this guide groove, the coupling member (bolt 24) can be reliably held by both the upper and lower breakable protrusions (the tongues 38, 39) in the normal state, and can deform and break the breakable protrusions in turn from the lower-rigidity breakable protrusion (the tongue 38) during the vehicle collision so as to allow the coupling member (bolt 24) to smoothly induce the relative displacements.

Other structure, functions and effects are substantially the same as those in the aforementioned embodiments and examples of modification. Thus, in FIG. 9, the same component or element is defined by the same reference numeral, and their detailed description will be omitted.

Figure 10:
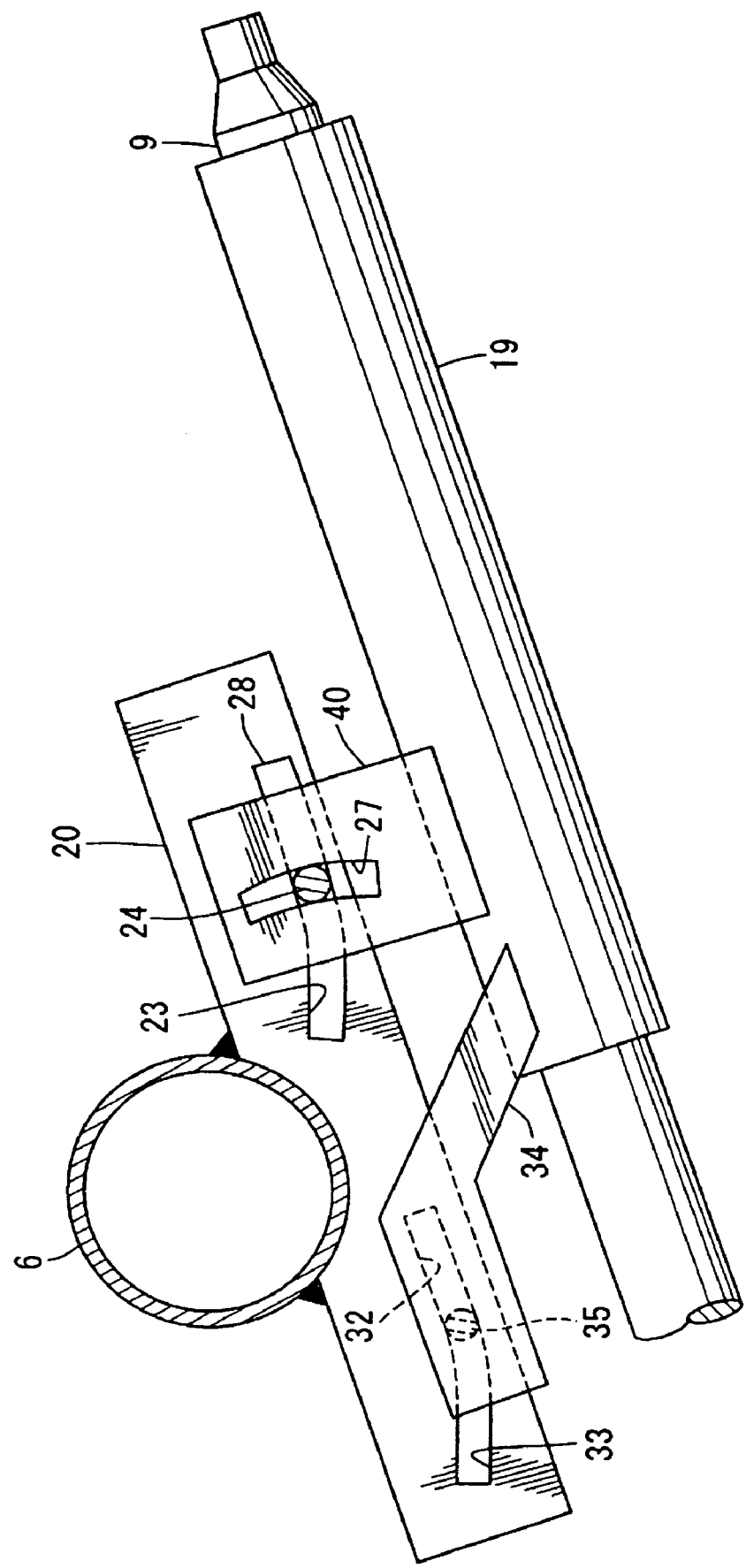
FIG. 10 is a schematic left side view showing a steering device support structure according to a second embodiment of the present invention.

FIG. 10 shows a steering device support structure according to a second embodiment of the present invention. While the second bracket in the first embodiment illustrated in FIGS. 2 to 7 is composed of two brackets, or the outer bracket 22 and the inner bracket 21, the steering device support structure according to the second embodiment illustrated in FIG. 10 has a single second bracket 40.

In the second embodiment illustrated in FIG. 10, two telescopic-adjustment grooves 28, 32 are formed to extend, respectively, from rear ends of a guide groove 23 and a guide groove 33 of a first bracket 20 fixed to a lower portion of the instrument-panel member 6, in the longitudinal direction of the vehicle integrally and continuously. Further, a tilt-adjustment groove 27 is formed in a second bracket 40 fixed to a steering column 19, to extend vertically in an arc form.

In a telescopic-adjustment operation for the steering shaft 9, a bolt 24 and a tilt-center shaft 35 are moved, respectively, along the telescopic-adjustment grooves 28, 32 to allow a position of the steering shaft 95 to be adjusted longitudinally. In a tilt-adjustment operation for the steering shaft 9, the tilt-adjustment groove 27 of the second bracket 40 is displaced along the bolt 24 about the tilt-center shaft 35 to allow the steering shaft 9 to be tilted vertically.

In the event of a vehicle collision, the bolt 24 and the tilt-center shaft are moved, respectively, along the guide groove 23 and the guide groove 33 to allow the steering shaft to be guided axially frontward and upward so as to displace the steering shaft 9 upward during the vehicle collision. This makes it possible to prevent the knee of a passenger from interfering with the steering shaft 9. In FIG. 10, the same component or element as that in the first embodiment is defined by the same reference numeral, and its detailed description will be omitted. In the second embodiment, the tongue 36 or tongues 38, 38 in the aforementioned examples of modification may also be used in the guide groove 23 illustrated in FIG. 10, as in the first embodiment.

As to the correspondence between the appended claims and the first and second embodiments, the second bracket in the appended claims corresponds to the two brackets consisting of the inner bracket 21 and the outer bracket 22 or the single bracket consisting of the second bracket 40 in the embodiments. In the same way, the coupling means corresponds to the bolt 24, and the breakable protrusion corresponds to the tongue 36, the upper tongue 38 or the lower tongue 39. While the upper tongue 38 in the guide groove illustrated in FIG. 9 is formed as a lower-rigidity breakable protrusion, the present invention is not limited to this configuration.

For example, in the guide groove illustrated in FIG. 9, the lower tongue for holding the bolt 24 from the lower edge of the guide groove may be formed to have a lower rigidity than the upper tongue to maximally protect the guide surface 23*a*.

In the above embodiments, the guide groove 23 for slidably holding the bolt 24 serving as the coupling member may be formed in a curved shape continuously extending from a rear end to a frond end thereof. In this case, the coupling member can be smoothly moved along the curved-shaped guide groove 23 during a vehicle collision.

Figure 11:
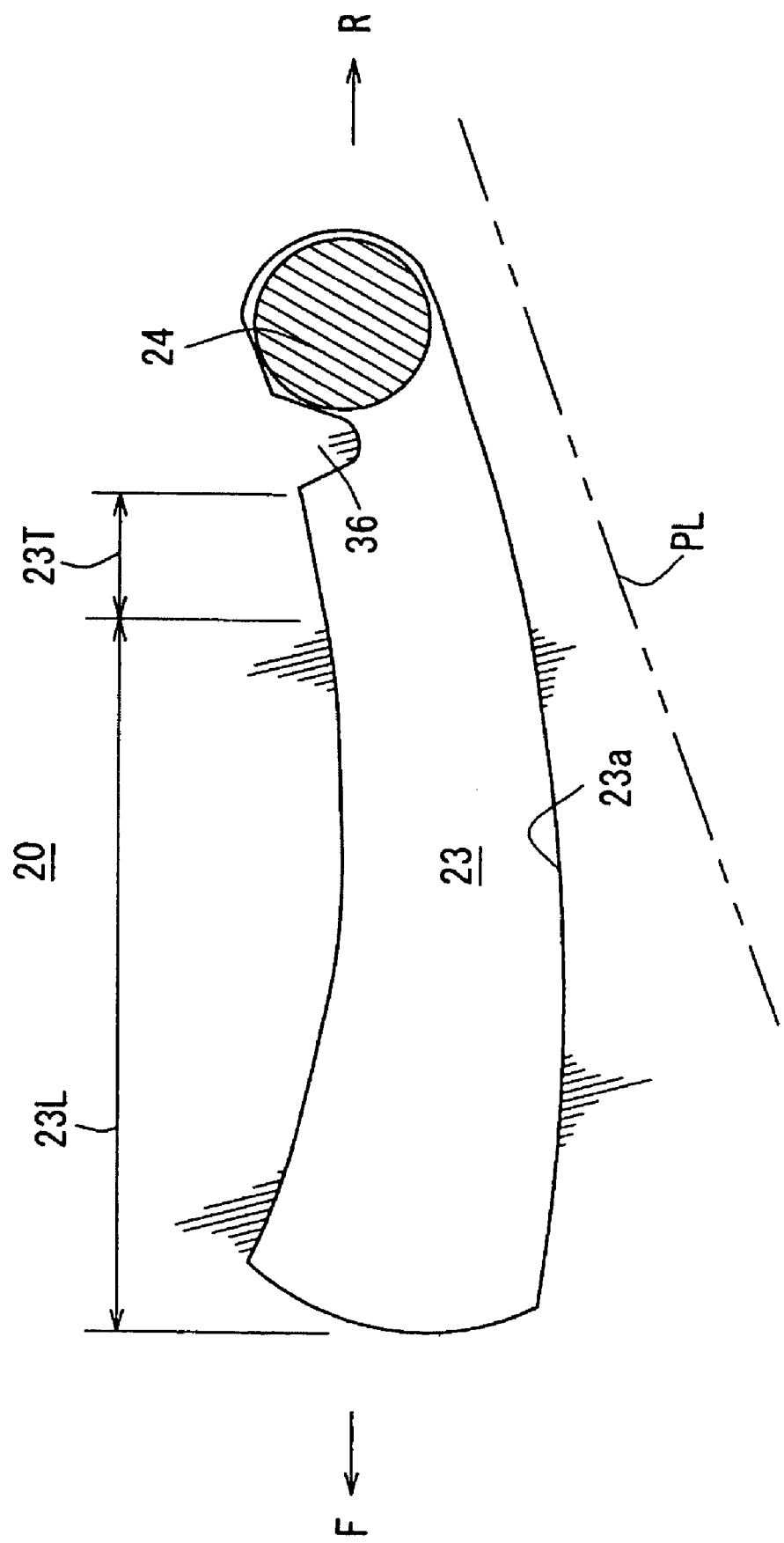
FIG. 11 is an explanatory enlarged side view showing yet another example of modification of the guide groove.

FIG. 11 shows another example of modification of the guide groove. In this case, a guide groove 23 is formed in an arc shape which is designed to displace the bolt 24 upward along with the progress of an axial relative displacement of the bolt 24 in a frontward direction on the basis of the axial direction of the steering shaft. Further, the arc shape is designed to limit an amount of the upward displacement of the bolt 24 to a relatively small value at an initial stage of the axial relative displacement of the bolt 24, and then increase the amount of the upward relative displacement along with the progress of the axial relative displacement.

Further, the arc-shaped guide groove 23 is formed in a curved shape which has a tight region 23T located on a rear end side thereof and a loose region 23L extending continuously from the tight region to a front end thereof. The loose region 23L is formed to have a groove width gradually increasing as coming closer to the front end. The tight region 23T is provided as a means to guide the bolt 24 while preventing the bolt 24 from being displaced vertically.

The aforementioned guide groove 33 is formed to have approximately the same shape as that of the guide groove 23 in FIG. 11.

Specifically, in the steering device support structure using the guide groove illustrated in FIG. 11, the coupling means includes the guide groove 23 formed in either one of the first bracket 20 and the second bracket (the brackets 21, 22) to extend upward in a front region thereof on the basis of the axial direction of the steering shaft 9, and the coupling member (bolt 24) slidably supported by the guide groove 23 to couple the first and second bracket together. The guide groove 23 has the tight region 23T located on the rear end side thereof and the loose region 23L extending continuously from the tight region 23T to the front end thereof.

According to this guide groove, the tight region 23T formed on the rear end side of the guide groove 23 makes it possible to prevent swing movement of the steering wheel 8 in the initial stage of the axial relative displacement. Further, the loose region 23L formed on the front end side of the guide groove 23 makes it possible to reliably displace the steering shaft 9 upward even if a component, such as the bracket, has a deformation due to a vehicle collision.

Further, the loose region 23L is formed to have a groove width gradually increasing as coming closer to the front end.

The guide groove designed to have a groove width gradually increasing as coming closer to the front end there allows the steering shaft 9 to be further reliably displaced upward even if a component, such as the bracket, has a deformation due to a vehicle collision.

Further, this guide groove 23 for slidably holding the bolt 24 serving as the coupling member is also formed in a curved shape continuously extending from a rear end to a frond end thereof. Thus, the coupling member can be smoothly moved along the curved-shaped guide groove 23 during a vehicle collision.

Other structure, functions and effects are substantially the same as those in the aforementioned embodiments and examples of modification. Thus, in FIG. 11, the same component or element is defined by the same reference numeral, and their detailed description will be omitted.

Figure 12:
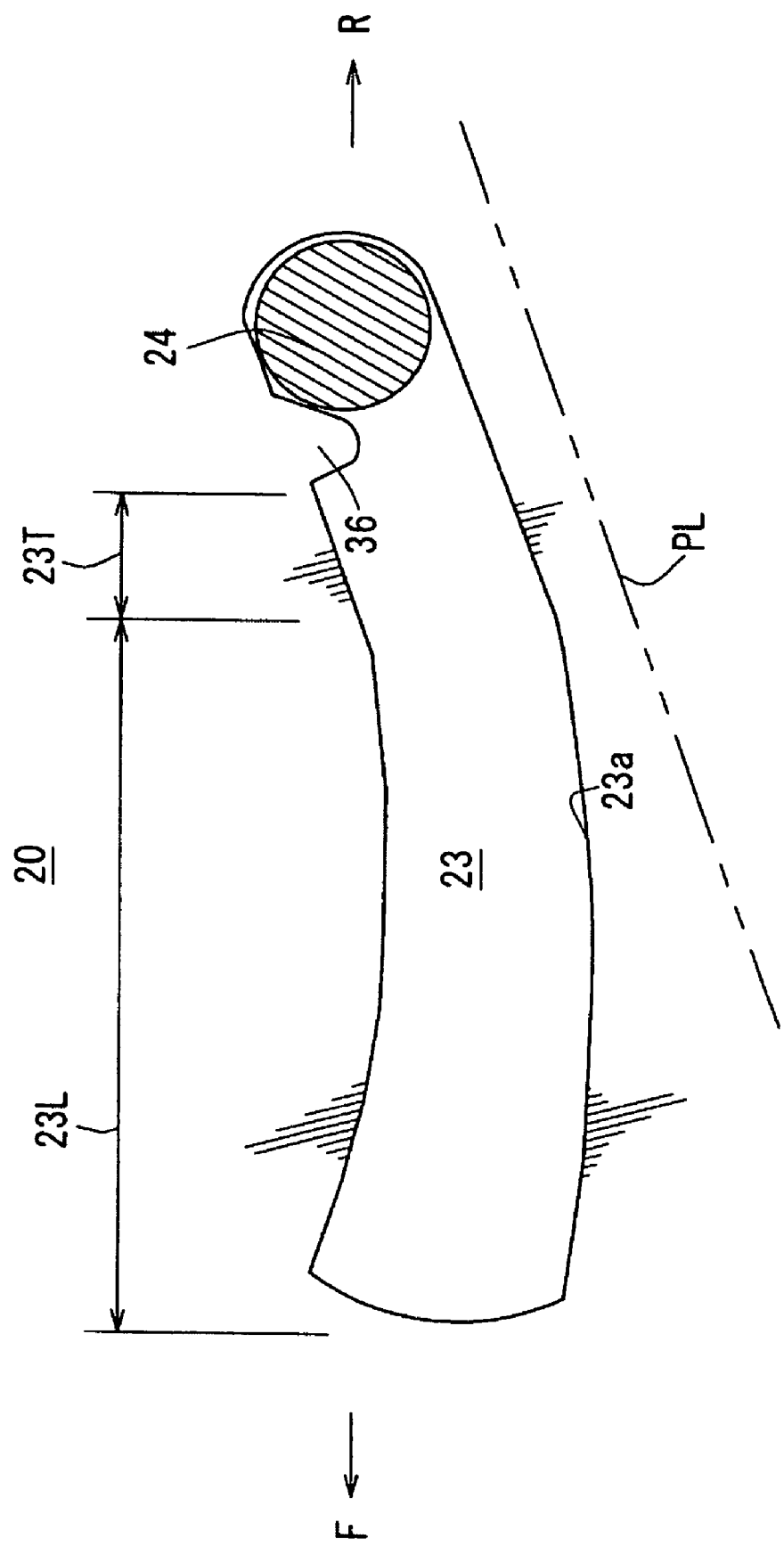
FIG. 12 is an explanatory enlarged side view showing still another example of modification of the guide groove.

FIG. 12 shows still another example of modification of the guide groove. In this case, a guide groove 23 is formed in an approximately arc shape which is designed to displace the bolt 24 upward along with the progress of an axial relative displacement of the bolt 24 in a frontward direction on the basis of the axial direction of the steering shaft 9. Further, the approximately arc shape is designed to limit an amount of the upward displacement of the bolt 24 to zero at an initial stage of the axial relative displacement of the bolt 24, and then increase the amount of the upward relative displacement along with the progress of the axial relative displacement.

Further, the approximately arc-shaped guide groove 23 is formed to have a tight region 23T located on a rear end side thereof and a loose region 23L extending continuously from the tight region to a front end thereof. The loose region 23L is formed to have a groove width gradually increasing as coming closer to the front end.

The tight region 23T is formed to extend parallel to the axial direction of the steering shaft 9 or fully parallel to the line PL illustrated in FIG. 12, or formed as a parallel region. Further, the loose region 23 L having a groove width gradually increasing as coming closer to the front end thereof serves as a front region of the guide groove 23

The aforementioned guide groove 33 is formed to have approximately the same shape as that of the guide groove 23 in FIG. 12.

That is, in the guide groove 23 illustrated in FIG. 12, the tight region 23T is formed to extend fully parallel to the axial direction of the steering shaft 9, and the loose region 23 L is formed to allow the amount of the upward relative displacement of the second bracket (the brackets 21, 22) to be increased as the amount of the axial relative displacement of the second bracket is increased.

According to this guide groove 23, in the initial stage of the axial displacement during a vehicle collision, the steering shaft 9 can be moved directly frontward along the tight region 23T fully parallel to the axial direction of the steering shaft 9 (or the parallel region), so as to prevent swing movement of the steering wheel 8. Then, the loose region 23L (or the front region) allows the steering shaft 9 to be displaced upward through the second bracket (the outer bracket 22 and the inner bracket 21) so as to prevent the knee of a passenger from interfering with the steering shaft 9.

Other structure, functions and effects are substantially the same as those in the aforementioned embodiments and examples of modification. Thus, in FIG. 12, the same component or element is defined by the same reference numeral, and their detailed description will be omitted.

Figure 13:
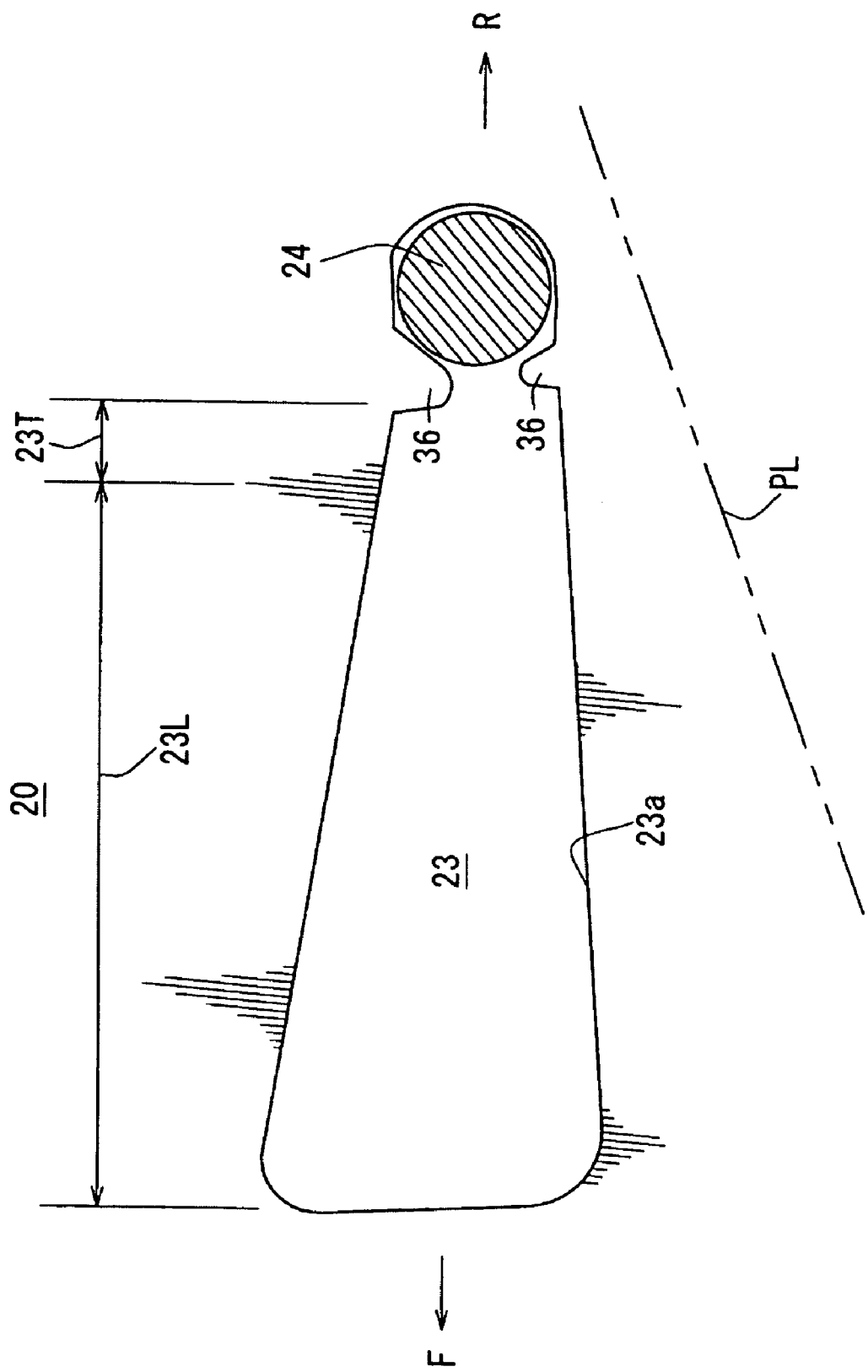
FIG. 13 is an explanatory enlarged side view showing yet still another example of modification of the guide groove.

FIG. 13 shows yet still another example of modification of the guide groove. In this case, a guide groove 23 is formed in an elongated triangular shape which is designed to displace the bolt 24 upward along with the progress of an axial relative displacement of the bolt 24 in a frontward direction on the basis of the axial direction of the steering shaft. Further, the elongated triangular shape is designed to limit an amount of the upward displacement of the bolt 24 to a relatively small value at an initial stage of the axial relative displacement of the bolt 24, and then increase the amount of the upward relative displacement along with the progress of the axial relative displacement of the bolt 24.

Thus, a linear lower guide surface 23*a* of the guide groove 23 is formed to have a rear end disposed close to the steering shaft 9, and a front end getting away from the steering shaft 9 upward.

The elongated triangular-shaped guide groove 23 is formed to have a tight region 23T located on a rear end side thereof and a loose region 23L extending continuously from the tight region to a front end thereof. The loose region 23L is formed to have a groove width gradually increasing as coming closer to the front end.

Further, in order to hold the bolt 24 in a normal position (a normal running state) or located in a rear region of the guide groove 23, from both upper and lower sides of the guide groove 23, a pair of upper and lower tongues 36, 36 is integrally formed with the first or second bracket in such a manner as to be disposed in an inner space of the guide groove 23. In this case, either one of the upper and lower tongues 36, 36 may be bent outward or reduced in thickness to make a difference in rigidity for holding the bolt 24, therebetween, so as to deform and break the tongues 36 in turn from the lower-rigidity tongue during the vehicle collision. The aforementioned guide groove 33 is formed to have approximately the same shape as that of the guide groove 23 in FIG. 13.

As above, in the guide groove 23 illustrated in FIG. 13, the tight region 23T and the loose region 23L are continuously formed, respectively, on the rear end side and on the front end side. Thus, the tight region 23T can prevent swing movement of the steering wheel 8 in the initial stage of the axial relative displacement. Further, the loose region 23L formed on the front end side of the guide groove 23 makes it possible to reliably displace the steering shaft 9 upward even if a component, such as the bracket, has a deformation due to a vehicle collision.

The loose region 23L is formed to have a groove width gradually increasing as coming closer to the front end. Thus, the steering shaft 9 can be further reliably displaced upward even if a component, such as the bracket, has a deformation due to a vehicle collision. Other structure, functions and effects are substantially the same as those in the aforementioned embodiments and examples of modification. Thus, in FIG. 13, the same component or element is defined by the same reference numeral, and their detailed description will be omitted.

Figure 14:
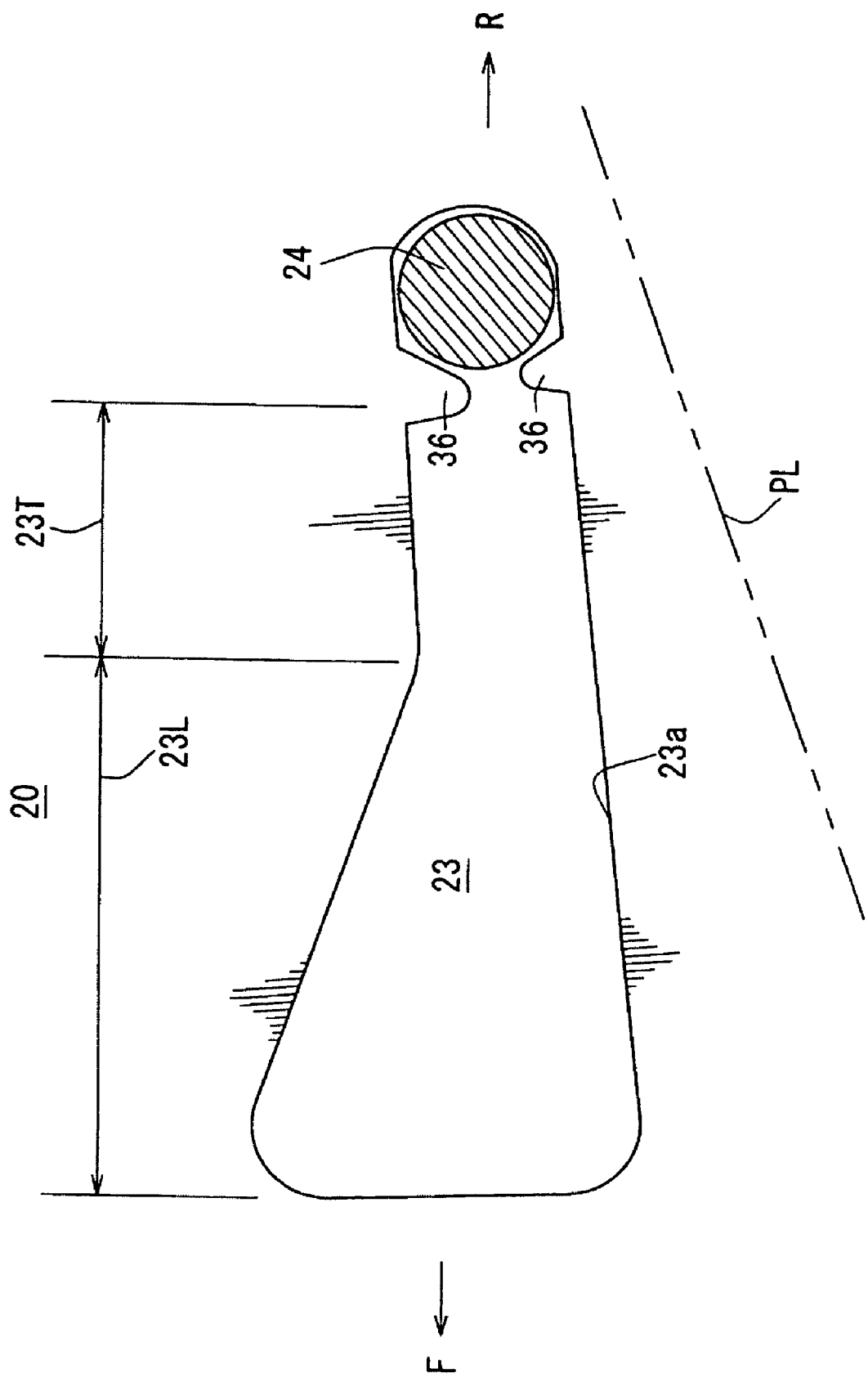
FIG. 14 is an explanatory enlarged side view showing another further example of modification of the guide groove.

FIG. 14 shows another further example of modification of the guide groove. In this guide groove 23, a rear tight region 23T is formed to have a length greater than that the rear tight region 23T in FIG. 13. This provides an advantage of being able to effectively prevent swing movement of the steering shaft 9 in the initial stage of the axial relative displacement.

Specifically, as with the aforementioned embodiments and examples of modification, the guide groove 23 illustrated in FIG. 14 is designed to displace the bolt 24 upward along with the progress of an axial relative displacement of the bolt 24 in a frontward direction on the basis of the axial direction of the steering shaft, and to limit an amount of the upward displacement of the bolt 24 to a relatively small value at an initial stage of the axial relative displacement of the bolt 24, and then increase the amount of the upward relative displacement along with the progress of the axial relative displacement. For this purpose, a linear lower guide surface 23a of the guide groove 23 is formed to have a rear end disposed close to the steering shaft 9, and a front end getting away from the steering shaft 9 upward.

Further, in the guide groove 23 in FIG. 14, the tight region 23T and the loose region 23L are continuously formed, respectively, on the rear end side and on the front end side, and the loose region 23L is formed to have a groove width gradually increasing as coming closer to the front end. The aforementioned guide groove 33 is formed to have approximately the same shape as that of the guide groove 23 in FIG. 14.

As above, in the guide groove 23 illustrated in FIG. 14, the tight region 23T and the loose region 23L are continuously formed, respectively, on the rear end side and on the front end side. Thus, as with the guide groove in FIG. 13, the tight region 23T can prevent swing movement of the steering wheel 8 in the initial stage of the axial relative displacement. Further, the loose region 23L formed on the front end side of the guide groove 23 makes it possible to reliably displace the steering shaft 9 upward even if a component, such as the bracket, has a deformation due to a vehicle collision.

The loose region 23L is formed to have a groove width gradually increasing as coming closer to the front end. Thus, the steering shaft 9 can be further reliably displaced upward even if a component, such as the bracket, has a deformation due to a vehicle collision.

Other structure, functions and effects are substantially the same as those in the aforementioned embodiments and examples of modification. Thus, in FIG. 14, the same component or element is defined by the same reference numeral, and their detailed description will be omitted.

FIGS. 15 to 22 show a steering device support structure according to a third embodiment of the present invention, wherein a protrusion 42 is provided in a portion of a first bracket 20 adjacent to an instrument-panel member 6 to protrude toward a top wall 22a of an outer bracket 11.

The protrusion 42 is integrally formed with the first bracket 20 during a process of bending the first bracket in a gate shape through a press forming process. In a normal state (normal running state), the protrusion 42 has a rear surface disposed in opposed relation to the top wall 22a of the outer bracket 22 and formed in a sharp-edged triangular pyramid shape. This protrusion 42 is designed to crush or press and deform a front region of an overlapping portion 22b of the outer bracket 22 downward during a vehicle collision.

An operation of this steering device support structure will be described in detail below.

In the event of a frontal impact collision, the engine 5 is moved rearward, and the upper body of a passenger set in a driver seat is moved frontward. While an airbag housed in a steering Wheel 8 is inflated to receive the upper body of the passenger, a load is imposed the steering shaft 9 at a given value causing an axially frontward movement of the steering shaft 9, or more.

This load is transmitted to a bolt 24 serving as the coupling member through the steering shaft 9, a steering column 19, the inner bracket 21 and the outer bracket 22. Then, in response the road transmitted to the bolt 24, the bolt 24 is moved to break a tongue 36, and then guided frontward along a lower guide surface 23a of a guide groove 23. In this process, an amount of an upward relative displacement of the bolt 24 is small in an initial stage of a frontward relative displacement of the bolt 24, because a rear region of the guide groove 23 is approximately parallel to the axial of the steering shaft 9, and then the upward relative displacement of the bolt 24 is increased along with the progress of the frontward relative displacement.

Figure 22:
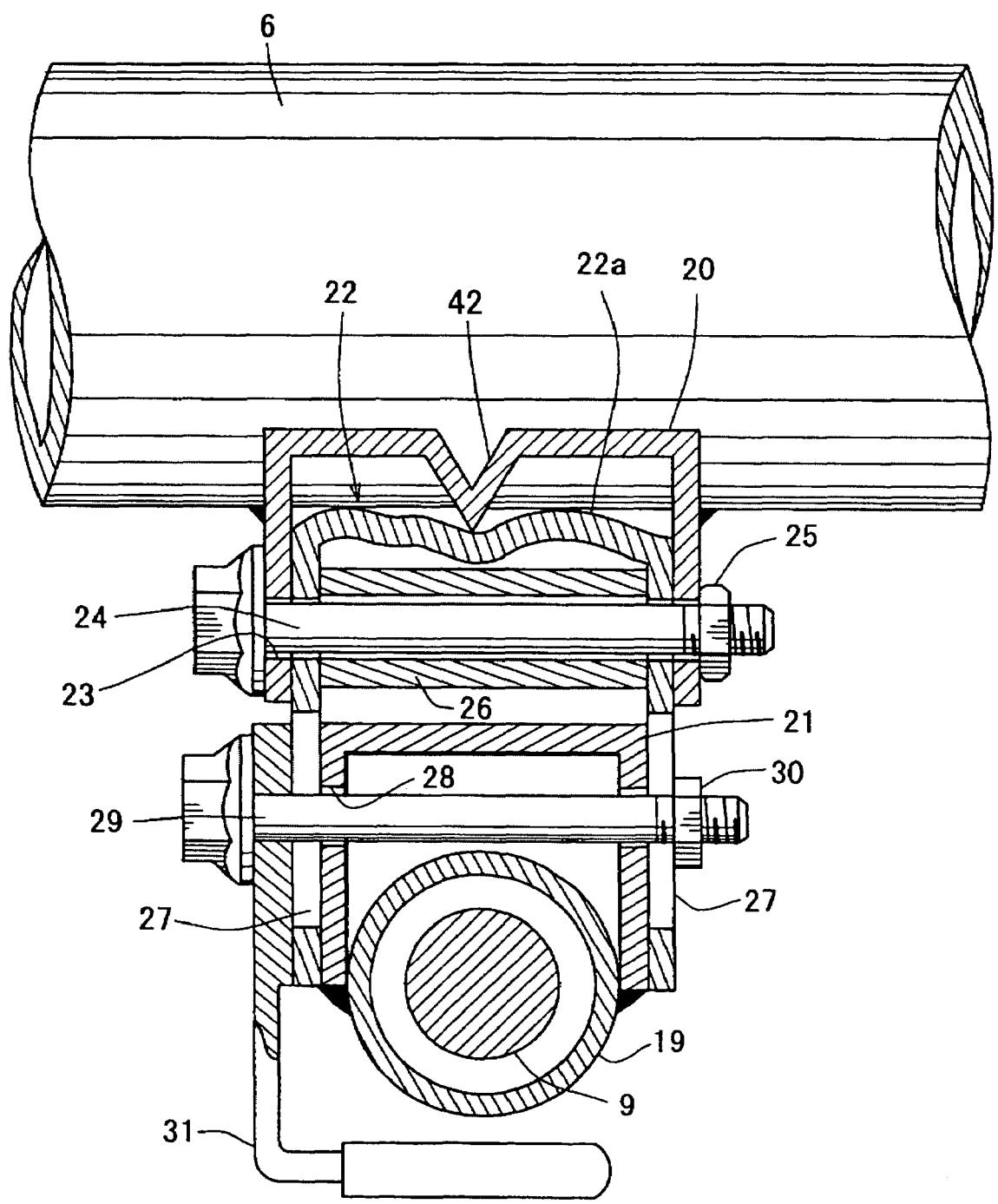
FIG. 22 is a sectional view showing a second bracket in a crushed state during a vehicle collision, taken along the line A-A in FIG. 15.

Thus, in a stage just after breakage of the tongue 36 during the vehicle collision and where the upper body of the passenger is still moved frontward with large kinetic energy (initial stage of the axial relative displacement), the steering shaft 9 can be accurately moved axially and frontward to prevent vertical swing of the steering wheel 8 so as to allow the airbag to reliably receive the passenger's upper body, and then the steering shaft 9 can be displaced upward as shown in FIG. 22, in a state after the airbag sufficiently receives the passenger.

Figure 21:
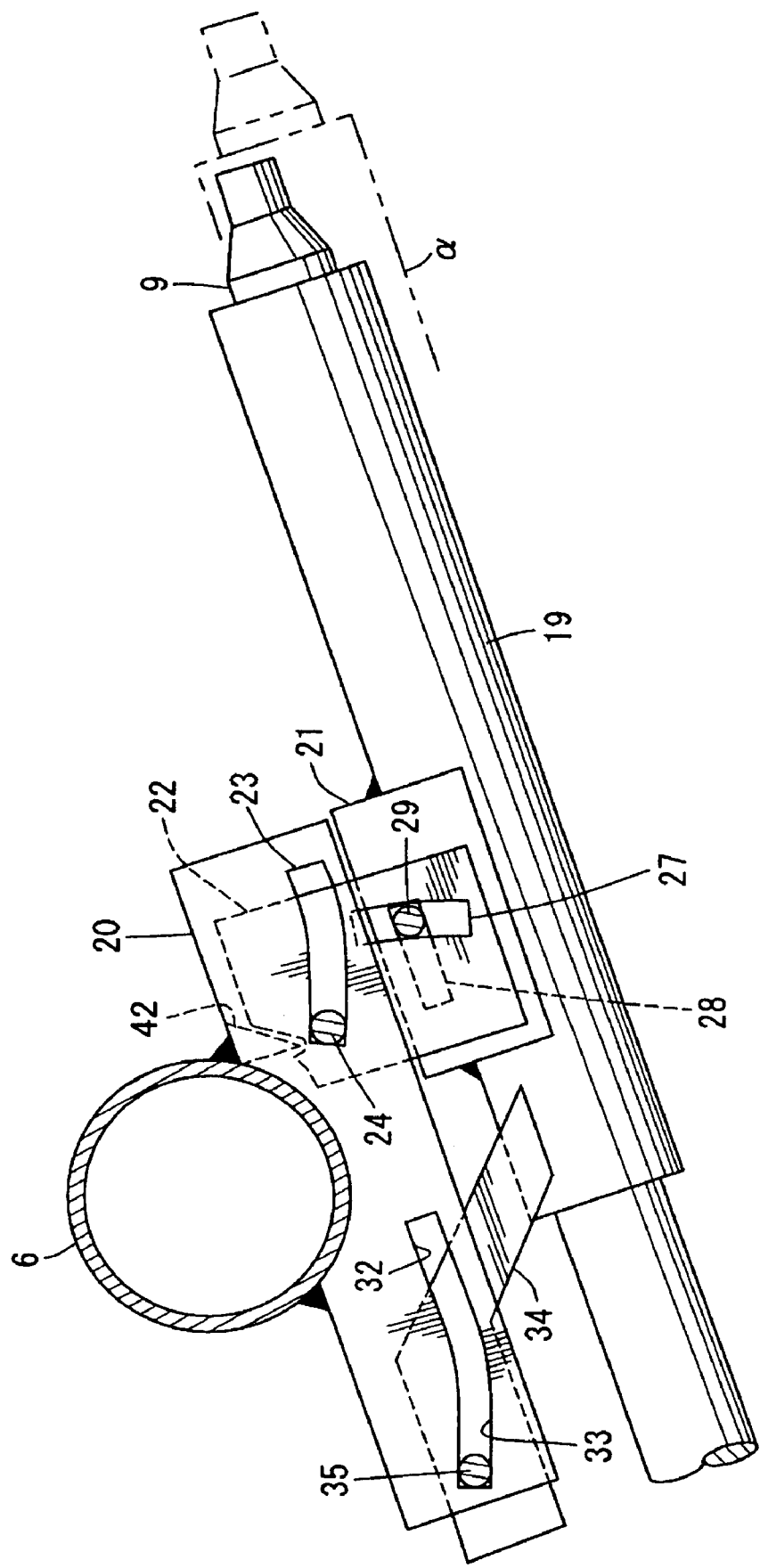
FIG. 21 is an explanatory left side view showing a displacement of the steering shaft in FIG. 18, during a vehicle collision.

The bolt 24 is moved together with the outer bracket 22, the inner bracket 21, the bolt 29, steering column 19 and the steering shaft 9. When the outer bracket 22 is moved close to the instrument-panel member 6 as shown in FIG. 21, the front region of the overlapping portion 22b in the top wall 22a of the outer bracket 22 is crushed or pressed downward and deformed by the protrusion 42. This makes it possible to avoid interference between the outer bracket 22 and the instrument-panel member and ensure the frontward and upward relative displacements of the outer bracket 22 on the basis of the axial direction of the steering shaft 9, so as to reliable prevent the knee of the passenger from interfering with the steering shaft 9.

Figure 15:
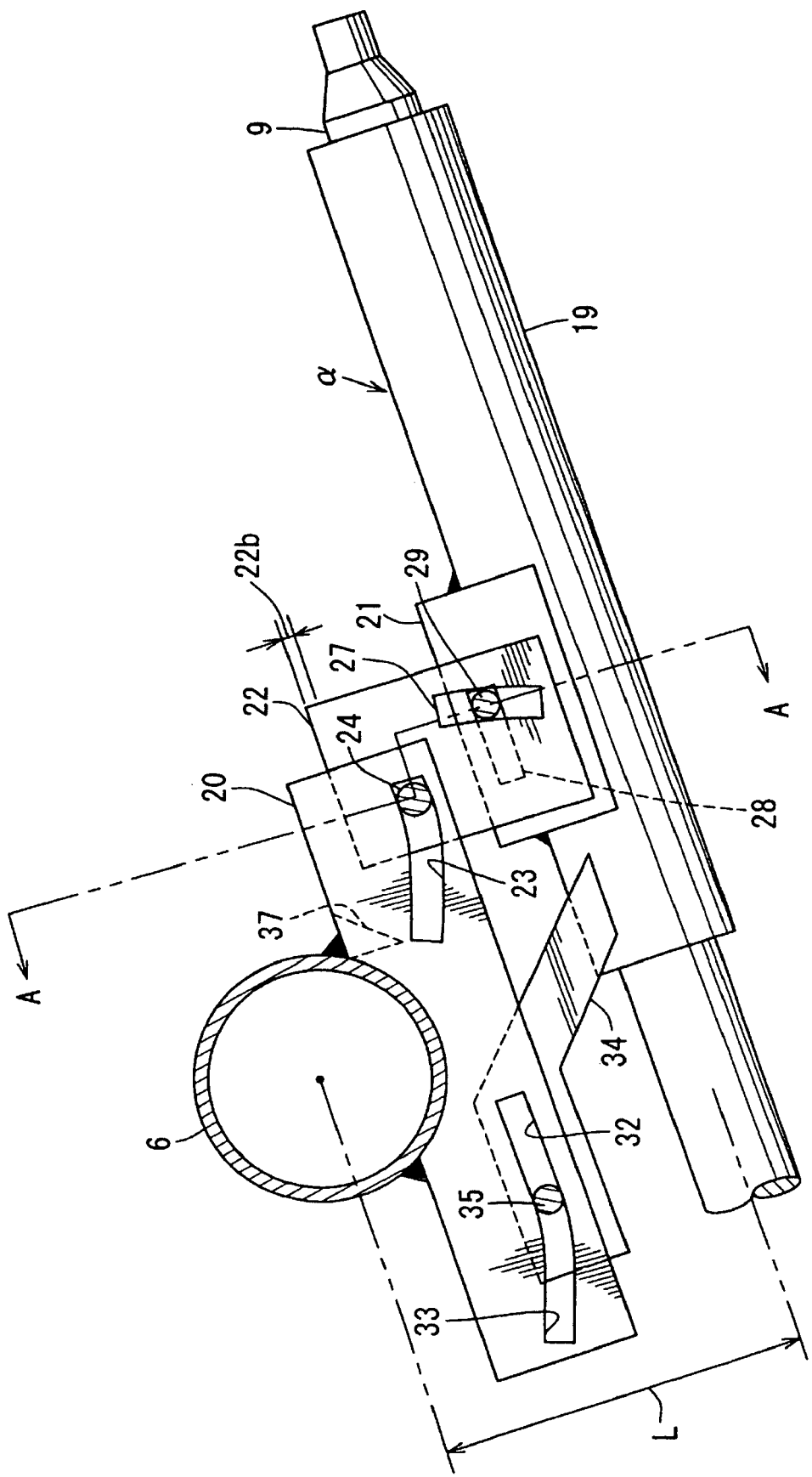
FIG. 15 is a schematic left side view showing a steering device support structure according to a third embodiment of the present invention.

In concurrence with the frontward and upward movement of the bolt 24, a tilt-center shaft 35 is guided frontward and upward along a guide groove 33, and thereby the steering shaft 9 is moved from a normal position illustrated in FIG. 15 frontward and upward as indicated by the solid line in FIG. 21.

As above, the steering device support structure according to the third embodiment illustrated in FIGS. 15 to 22 is designed as follows: in the structure for supporting the steering device comprising the first bracket 20 fixed to the instrument-panel member 6, the second bracket (outer bracket 21, inner bracket 22) fixed to the steering column 19 rotatably mounting the steering shaft 9, and the coupling means (guide groove 23, the bolt 24) for providing a coupling between the first bracket 20 and the second bracket (brackets 21, 22), wherein the coupling means (guide groove 23, the bolt 24) is designed to allow the second bracket (brackets 21, 22) to have an axially-forward relative displacement with respect to the first bracket 10 on the basis of the axial direction of the steering shaft 9 while allowing an upward relative displacement of the second bracket (brackets 21, 22) with respect to the first bracket 20 in the course of the axially-frontward relative displacement, during a vehicle collision, the second bracket (see: the outer bracket 22) is disposed in such a manner as to partly overlap with the instrument-panel member 6 vertically. The structure includes means for crushing the front region of the overlapping portion 22b of the second bracket during interference with the instrument-panel member 6.

According to this structure, the second bracket (see: the outer bracket 22) is disposed in such a manner as to partly overlap with the instrument-panel member 6 vertically. Thus, a span L between the instrument-panel member 6 and the steering shaft 9 can be minimized while allowing each of the instrument-panel member 6 and the steering shaft 9 to be located at an adequate position, so as to facilitate downsizing of the second bracket (brackets 21, 22).

Further, in a normal state (in a non-collision state), the coupling member (guide groove 23, bolt 24) allows the first bracket 20 and the second bracket (brackets 21, 22) each arranged at an adequate position as described above to be coupled together so as to ensure a steering operation by a passenger Furthermore, when the second bracket (brackets 21, 22) has the axial relative displacement and the upward relative displacement during a vehicle collision, the front region of the overlapping portion 22b of the second bracket (see: the outer bracket 22) is brought into interference with the instrument-panel member 6 and crushed. This is makes it possible to reliably move the second bracket (brackets 21, 22) and reliably displace the steering shaft 9 axially and upward so as to prevent the knee of the passenger from interfering with the steering shaft 9.

As above, this structure makes it possible to reliably displace the steering shaft 9 axially and upward during the vehicle collision while reducing the span L between the instrument-panel member 6 and the steering shaft 9.

Further, the protrusion 42 is formed in a portion of the first bracket 20 adjacent to the instrument-panel member to protrude toward the second bracket (brackets 21, 22). The protrusion 42 is adapted to press the front region of the overlapping portion 22b downward during the interference so as to cause a deformation in the front region.

According to this structure, the front region of the overlapping portion 22b of the second bracket (see: outer bracket 22) can be reliably pressed downward and deformed by the protrusion 42. This makes it possible to assure a reliable movement of the second bracket (brackets 21, 22) during the vehicle collision.

As described in this embodiment, when the protrusion 42 is integrally formed with the first bracket 20 during the press forming process for the first bracket 20, a process time and the number of components can be reduced. Instead of forming the protrusion 42 integrally with the first bracket 20, a protrusion member 42 formed of a solid body having a triangular pyramid shape may be joined or fixedly attached to a given position of the first bracket 20 by welding or the like.

Figure 16:
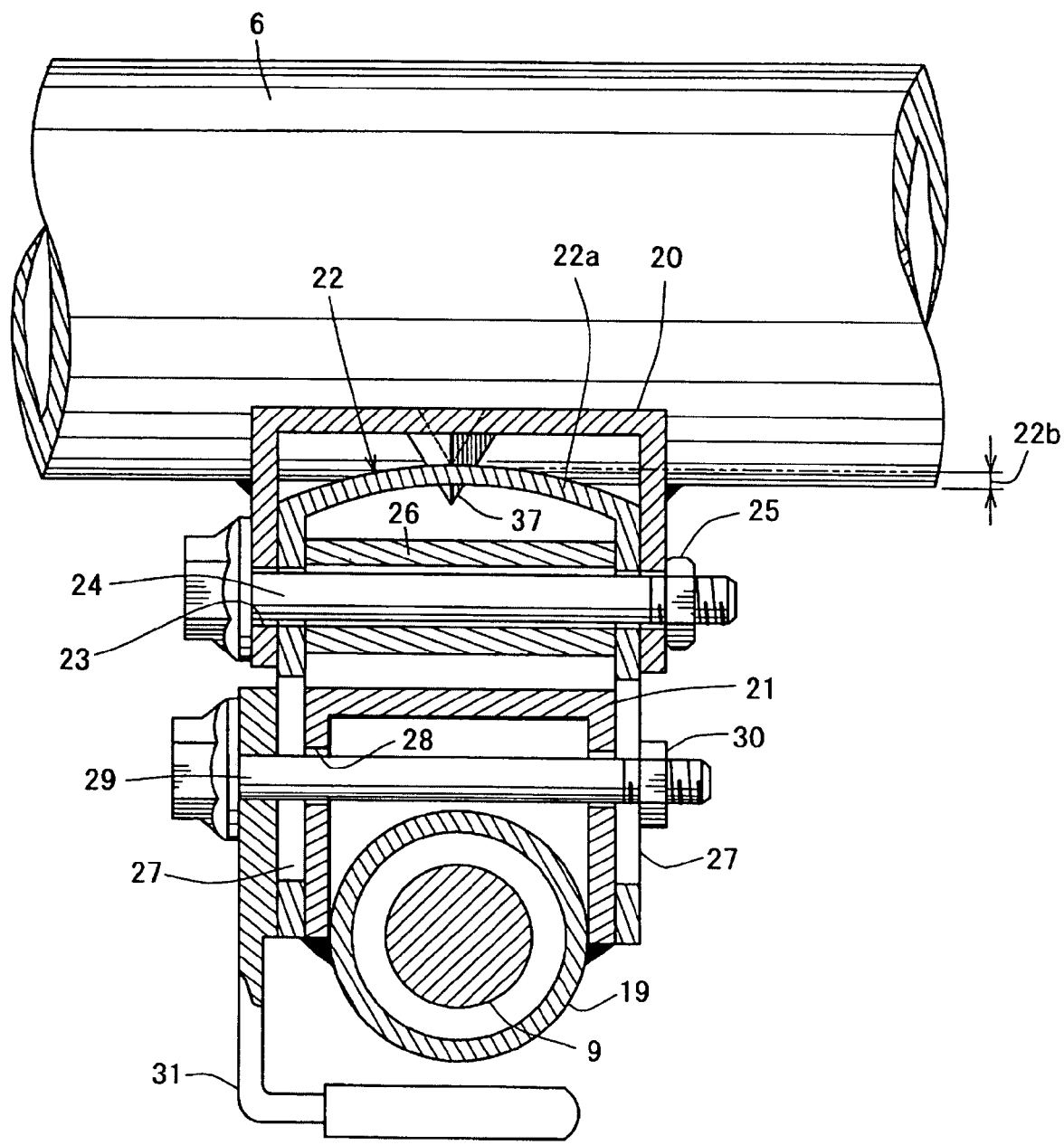
FIG. 16 is a sectional view taken along the line A-A in FIG. 15.
Figure 17:
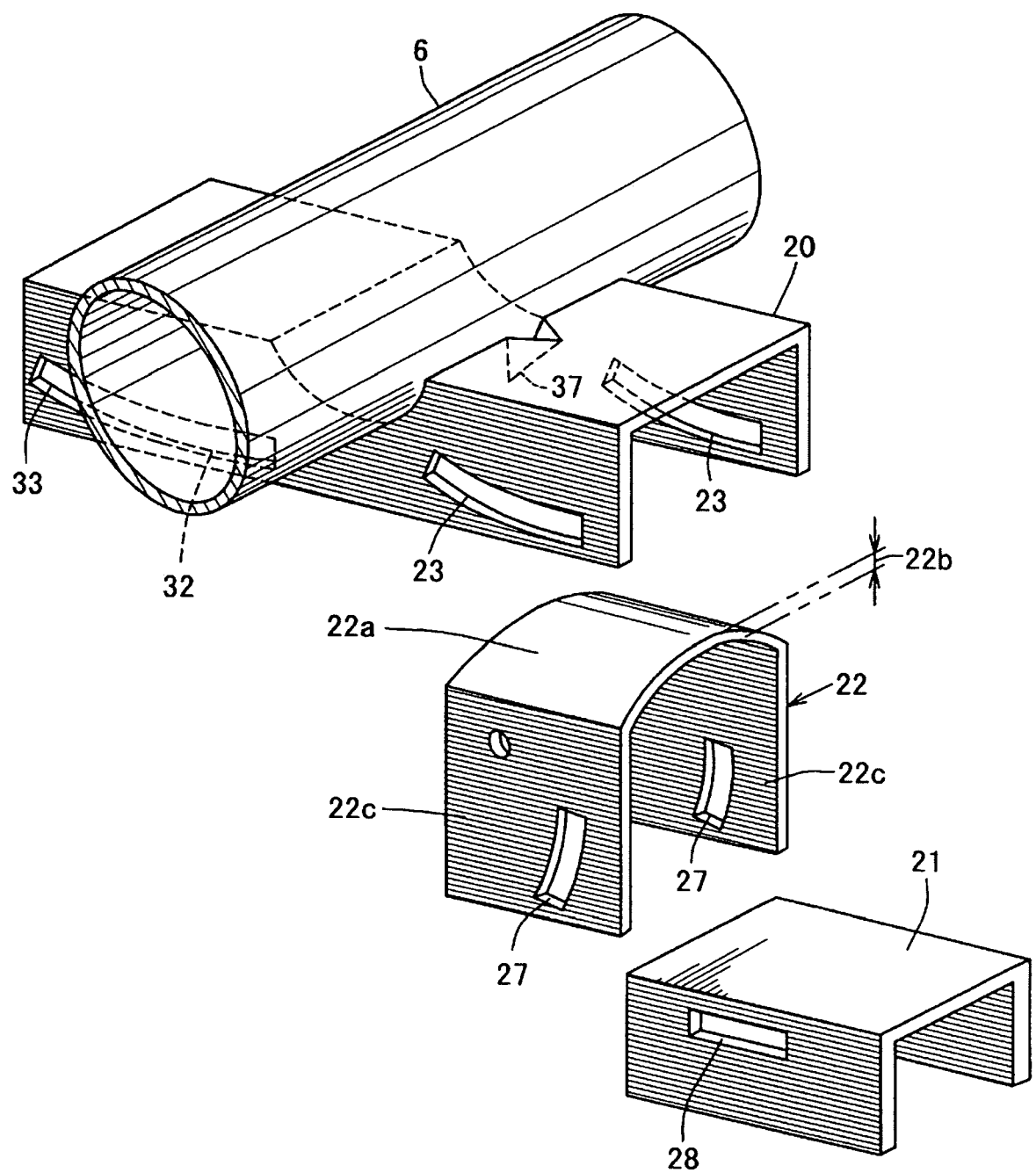
FIG. 17 is a fragmentary exploded perspective view showing the steering device support structure in FIG. 16.
Figure 18:
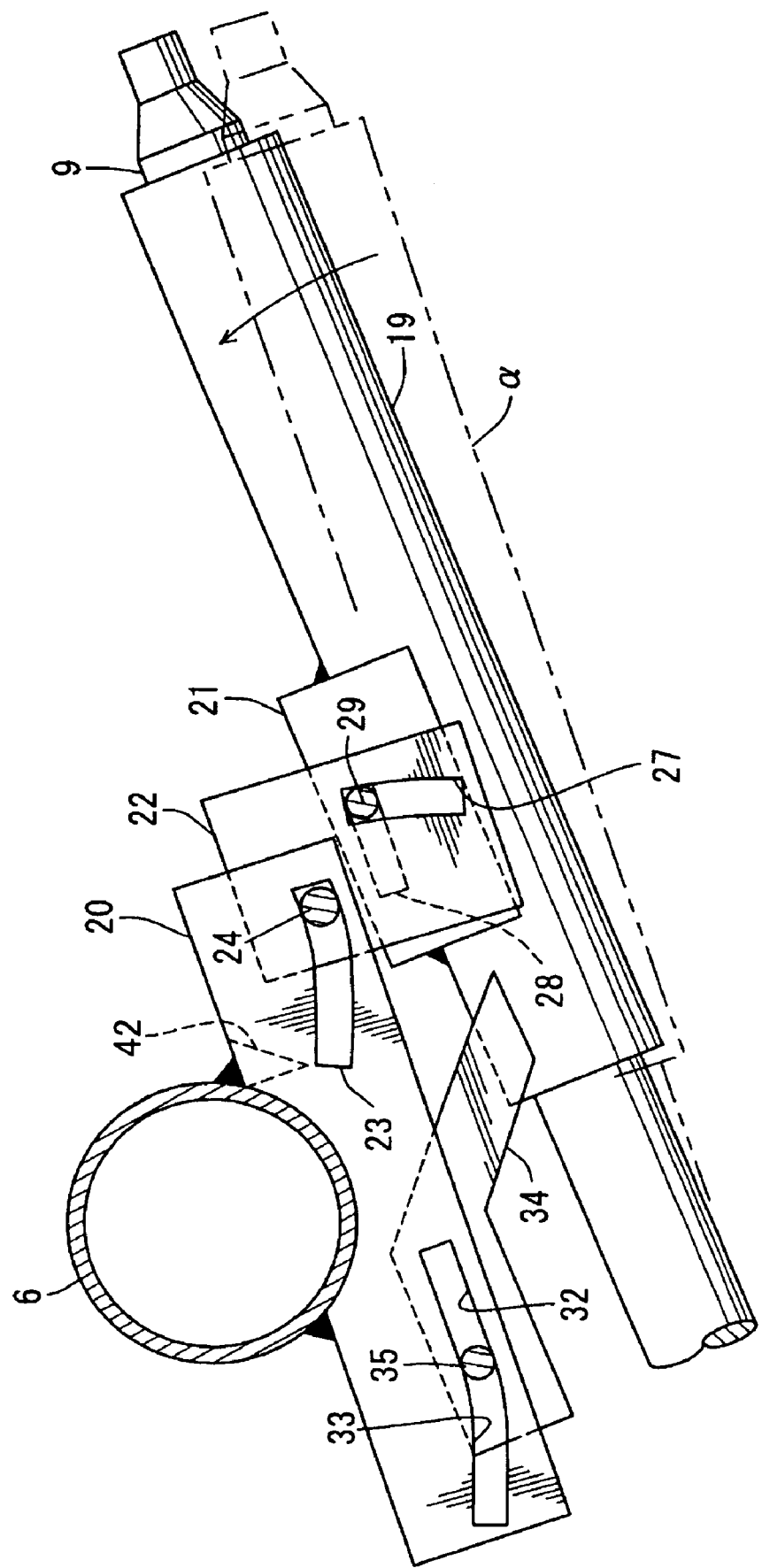
FIG. 18 is an explanatory left side view showing a tilt movement of a steering shaft of the steering device support structure in FIG. 15.
Figure 19:
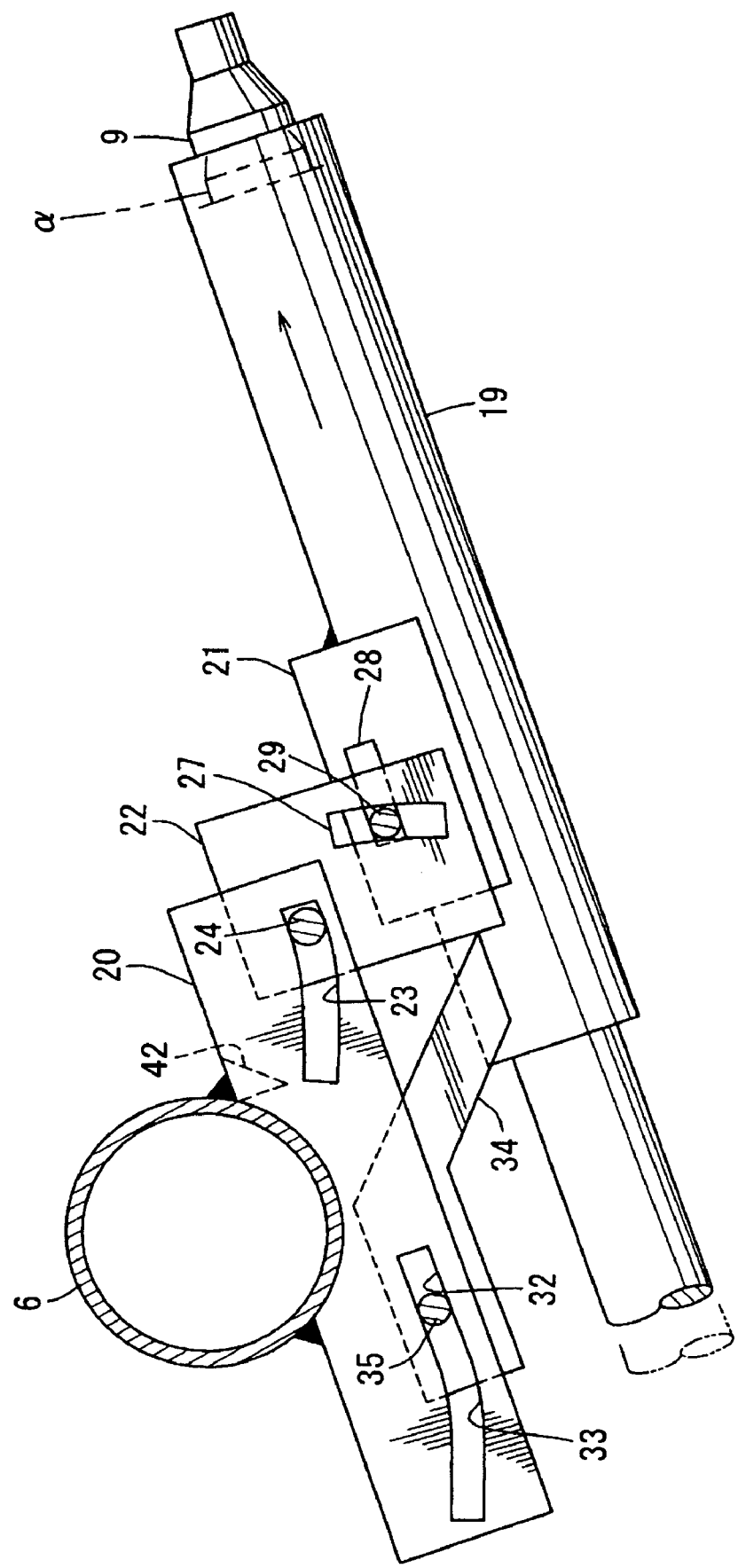
FIG. 19 is an explanatory left side view showing a telescopic movement of the steering shaft in FIG. 18.
Figure 20:
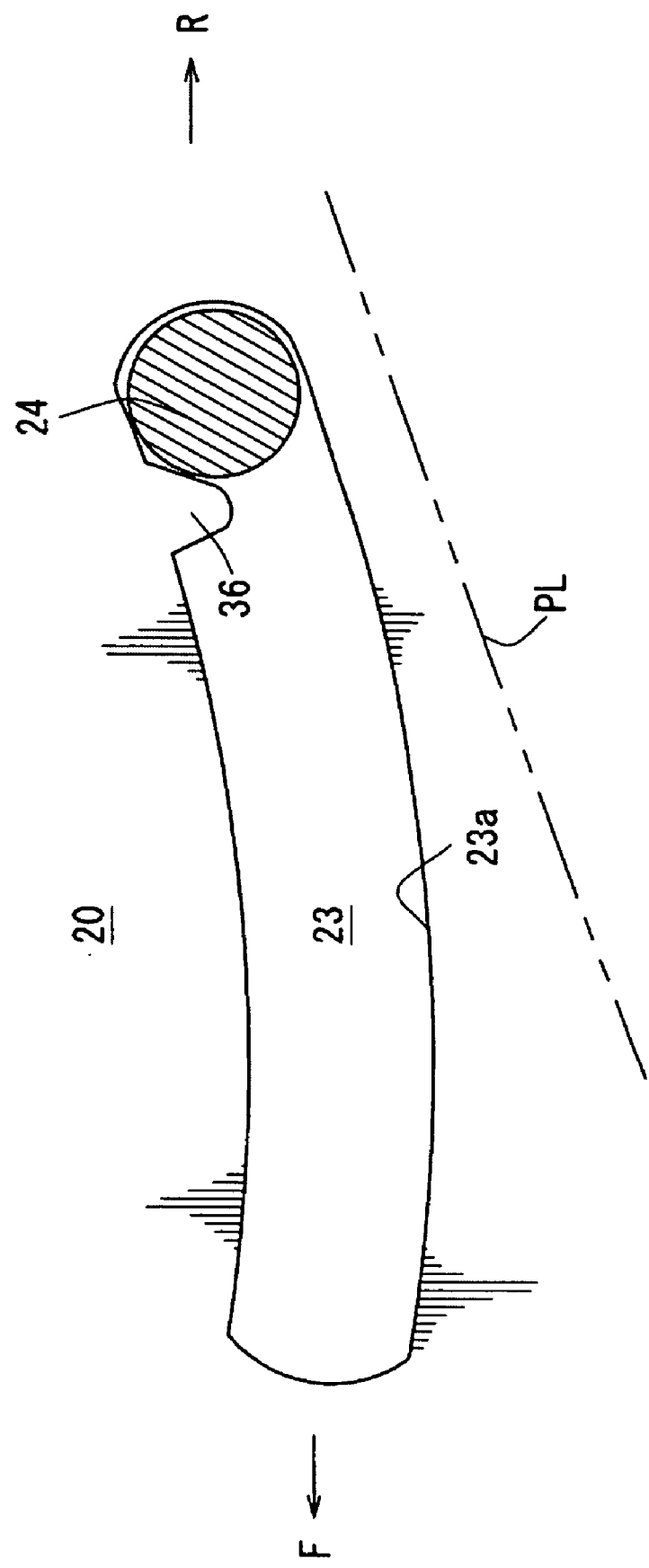
FIG. 20 is an enlarged side view showing a guide groove in the steering device support structure in FIG. 15.
Figure 23:
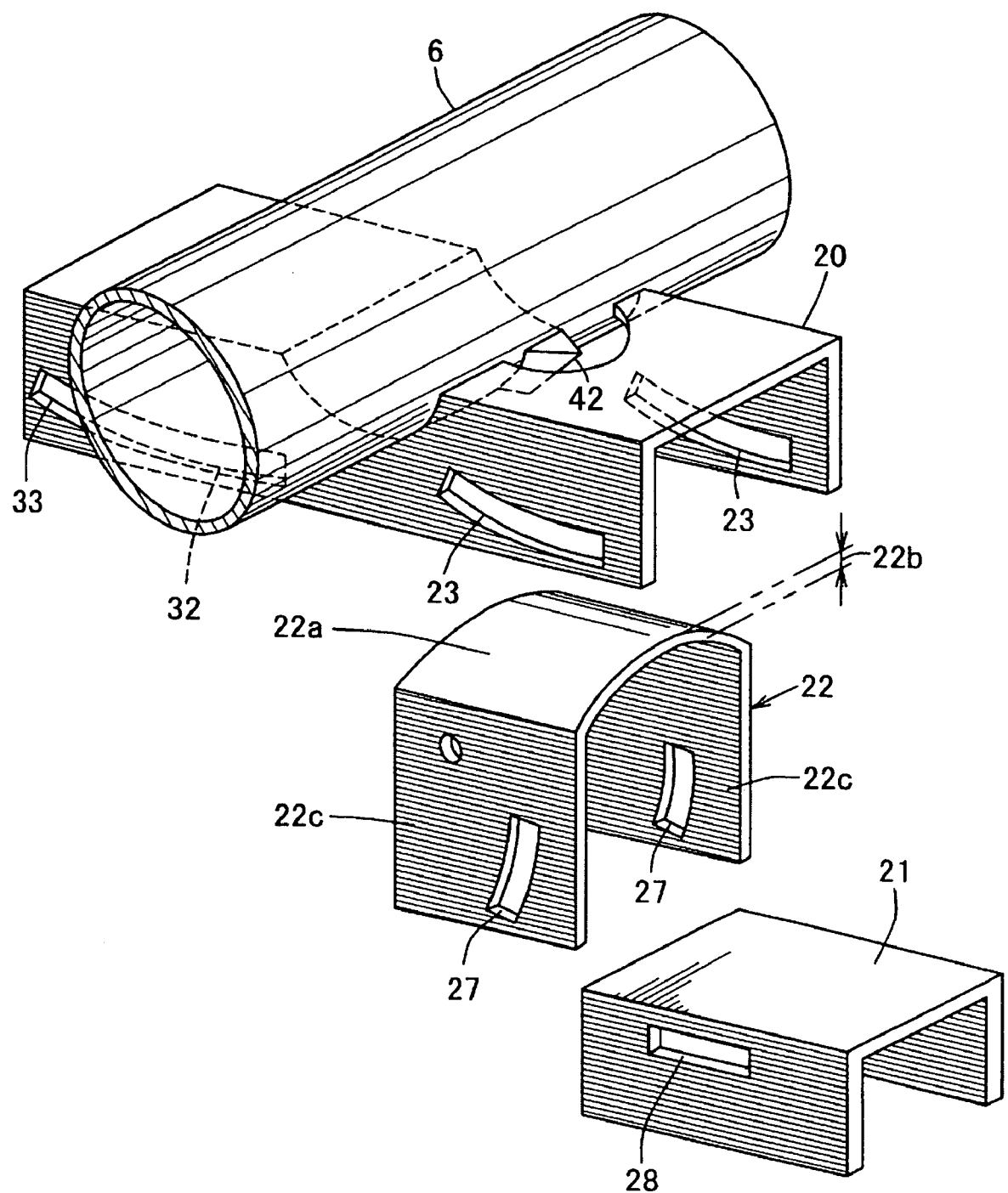
FIG. 23 is a fragmentary exploded perspective view showing one example of modification of crushing means.

While the protrusion 42 in the third embodiment illustrated in FIG. 16 is formed at a laterally central position of the first bracket 20 in a number of one, a plural number (e.g. two) of the protrusions 42 may be formed in the first bracket 20 at certain intervals in the lateral direction FIG. 23 is a fragmentary exploded perspective view showing one example of modification of crushing means. In the above third embodiment illustrated in FIGS. 15 to 22, the protrusion 42 serving as crushing means is formed in a portion of the first bracket 20 adjacent to the instrument-panel member 6 to protrude toward the second bracket. In the steering device support structure illustrated in FIG. 23, a protrusion 42 serving as crushing means is fixed directly in the instrument-panel member 6 at a position opposed to the top wall 22a of the outer bracket 22.

The protrusion 42 is composed of a solid body having a rear surface formed in a sharp-edged triangular pyramid shape and fixedly joined to the instrument-panel member 6 by welding or the like.

In the steering device support structure illustrated in FIG. 23, the protrusion 42 is fixed to the instrument-panel member 6 to protrude toward the second bracket (see: the outer bracket 22), so as to press and deform the front region of the overlapping portion 22b downward during interference therewith or during a vehicle collision.

Thus, this protrusion 42 can reliably press and deform the front region of the overlapping portion 22b of the second bracket (see: the outer bracket 22) downward to ensure a reliable movement of the second bracket (brackets 21, 22) during a vehicle collision. Other structure, functions and effects are substantially the same as those in the aforementioned embodiments and examples of modifications. Thus, in FIG. 23, the same component or element is defined by the same reference numeral, and their detailed description will be omitted. It is understood that the protrusion 42 directly fixed to the instrument-panel member 6 may be used in combination with the protrusion 42 provided in a portion of the first bracket 20 adjacent to the instrument-panel member, and they may be arranged spaced apart from each other in the lateral direction.

Figure 24:
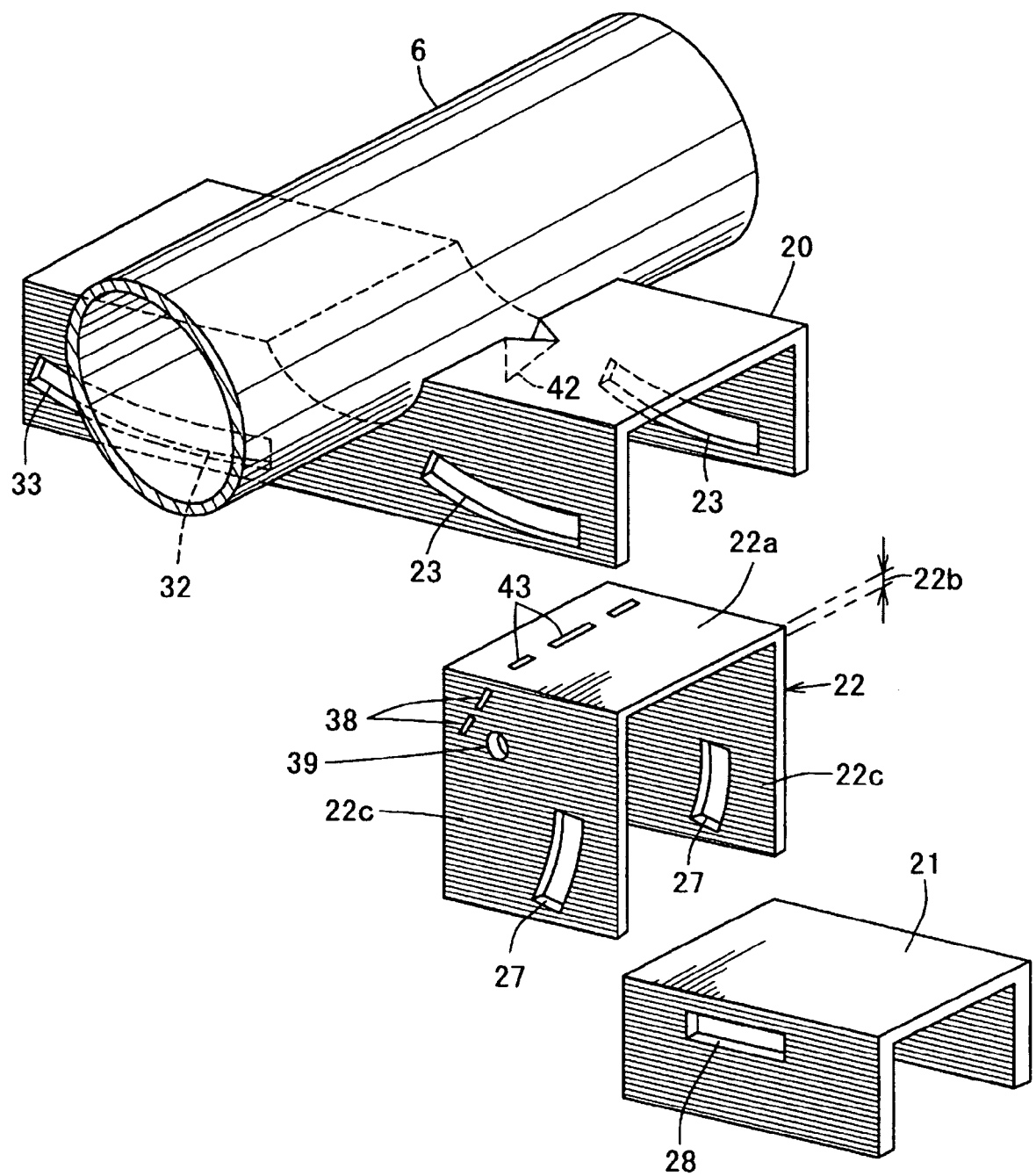
FIG. 24 is a fragmentary exploded perspective view showing another example of modification of the crushing means.

FIG. 24 shows is a fragmentary exploded perspective view showing another example of modification of the crushing means. In this steering device support structure, the top wall 22a of the outer bracket 22 forming an upper portion of the second bracket is formed in a flat shape, and a plurality of slits (brittle or weakened portion) serving as a deformation-inducing portion (or deformation-acceleration portion) adapted to readily induce a deformation in the front region of the overlapping portion 22a during interference with the instrument-panel member 6 are formed in the outer bracket 22 at intervals or discontinuously.

In this structure, when the second bracket is moved with respect the first bracket 20 forward and upward on the basis of the axial direction of the steering shaft 9 during a vehicle collision, and the front region of the outer bracket is bring into interference with the protrusion 42, a region located frontward reflective to the slits 43 is crushed or pressed downward and deformed by the protrusion 42.

Further, the discontinuous structure of the slits 43 makes it possible to ensure the rigidity of the outer bracket 22 for supporting the steering device, in a normal state.

As above, in the steering device support structure illustrated in FIG. 24, the slits 43 are discontinuously formed in the second bracket (see: outer bracket 22), as a deformation-inducing portion adapted to induce a deformation in the front region of the overlapping portion 22a during interference with the instrument-panel member 6.

According to this structure, the front region of the overlapping portion 22b of the second bracket (outer bracket 22) can be further reliably deformed based on the deformation-inducing portion (slits 43) of the second bracket.

Other structure, functions and effects are substantially the same as those in the aforementioned embodiments and examples of modifications. Thus, in FIG. 24, the same component or element is defined by the same reference numeral, and their detailed description will be omitted.

Figure 25:
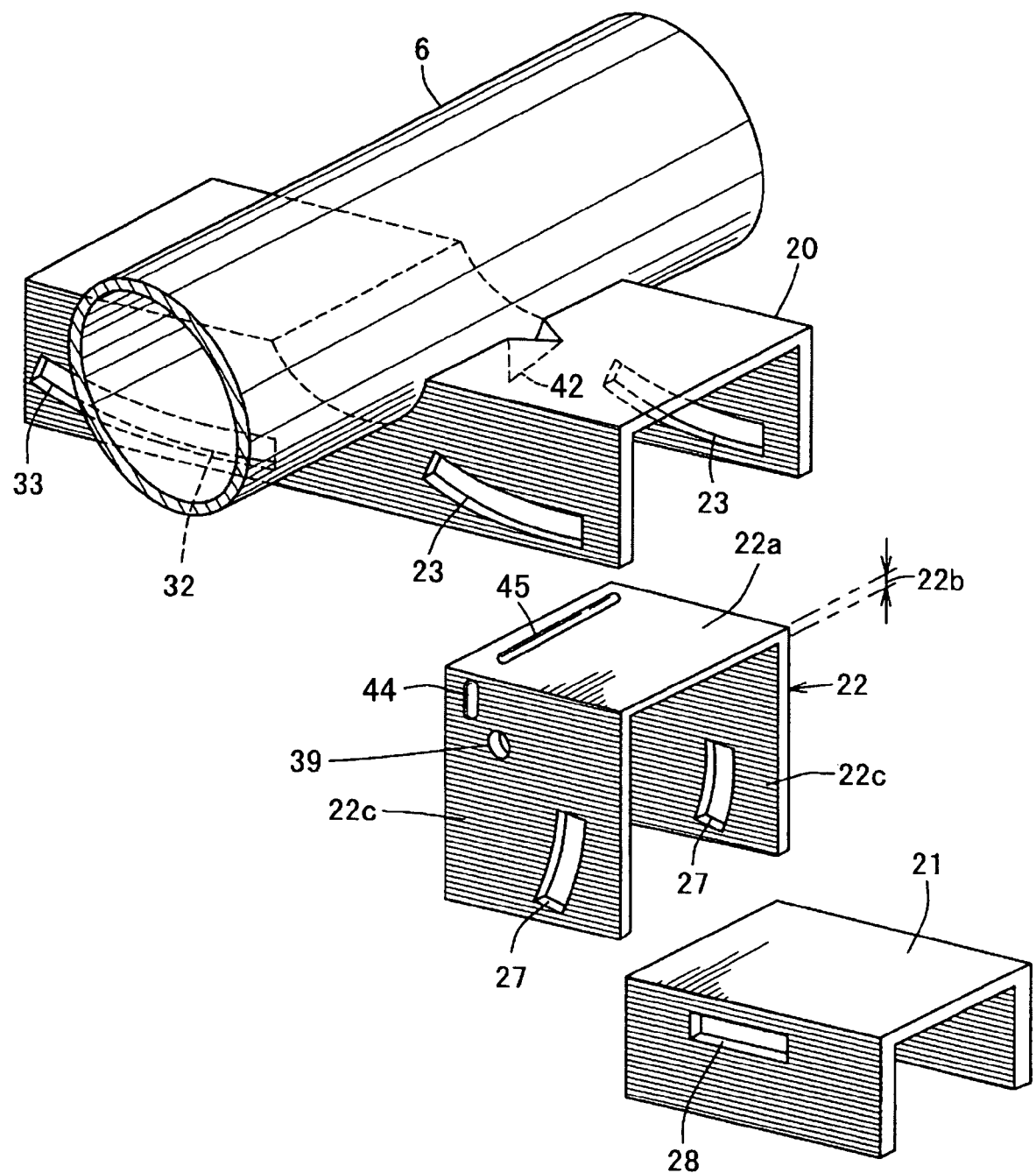
FIG. 25 is a fragmentary exploded perspective view showing yet another example of modification of the crushing means.

FIG. 25 shows is a fragmentary exploded perspective view showing another example of modification of the crushing means. In this steering device support structure, the top wall 22a of the outer bracket 22 forming an upper portion of the second bracket is formed with a plurality of beads 45, 44 which serve as a deformation-inducing portion adapted to readily induce a deformation in the front region of the overlapping portion 22a during interference with the instrument-panel member 6.

The bead 44 is formed in the side wall 22c of the outer bracket 22 to extend vertically, and concaved toward the inside of the outer bracket 22. The bead 45 is formed in the top wall 22c of the outer bracket 22 to extend laterally, and concaved toward the inside of the outer bracket 22. The beads 44, 45 concaved toward the inside of the outer bracket 22 never hider the relative movements of the outer bracket 22 with respect to the first bracket 20. Further, the beads 44, 45 (weakened portion) make it possible to allow the front region of the overlapping portion 22a to be readily deformed during the interference with the instrument-panel member 6 while ensuring the rigidity of for supporting the steering device, in a normal state.

In this structure, when the second bracket is moved with respect the first bracket 20 forward and upward on the basis of the axial direction of the steering shaft 9 during a vehicle collision, and the front region of the outer bracket is bring into interference with the protrusion 42, a region formed with the beads 44, 45 or located frontward reflective to the beads 44, 45 is crushed or pressed downward and deformed by the protrusion 42.

As above, in the steering device support structure illustrated in FIG. 25, the beads 44, 45 are formed in the second bracket (see: outer bracket 22), as a deformation-inducing portion adapted to induce a deformation in the front region of the overlapping portion 22a during interference with the instrument-panel member 6.

According to this structure, the front region of the overlapping portion 22b of the second bracket (outer bracket 22) can be further reliably deformed based on the deformation-inducing portion (beads 44, 45) of the second bracket.

Other structure, functions and effects are substantially the same as those in the aforementioned embodiments and examples of modifications. Thus, in FIG. 25, the same component or element is defined by the same reference numeral, and their detailed description will be omitted.

In sum, the present invention provides a structure for supporting a steering device including a steering shaft adapted to transmit a steering force of a steering wheel to road wheels, relative to a vehicle body through an instrument-panel member extending a lateral direction of a vehicle. The structure comprises a first bracket fixed to the instrument-panel member, a steering column rotatably mounting the steering shaft, a second bracket fixed to the steering column, and coupling means for providing a coupling between the first and second brackets. The coupling means is designed to allow the second bracket to have an axial relative displacement with respect to the first bracket on the basis of an axial direction of the steering shaft while allowing an upward relative displacement of the second bracket with respect to the first bracket in the course of the axial relative displacement, during a vehicle collision.

In the above structure of the present invention, the coupling means is operable, in a normal state, to couple the first and second brackets together, and, in the event of a vehicle collision, to allow the second bracket to have the axial relative displacement while displacing the second bracket upward in the course of the axial relative displacement. Thus, the steering shaft can be displaced upward during the vehicle collision while ensuring a steering operation by a passenger in the normal state. This makes it possible to prevent the knee of the passenger from interfering with the steering shaft during the vehicle collision.

In a first specific embodiment of the present invention, the coupling means may include a guide groove formed in either one of the first and second brackets to extend upward in a front region thereof on the basis of an axial direction of the steering shaft, and a coupling member slidably supported by the guide groove to couple the first and second bracket together, wherein the guide groove has a breakable protrusion disposed therein and adapted to inhibit the relative displacements in a normal state and to be broken (fracture, rupture, buckling, bending, flexure, etc.) by the coupling member during a vehicle collision so as to permit the relative displacements.

This structure can satisfy both of the needs to ensure a rigidity for supporting the steering shaft, in the normal state, and to permit the relative displacements of the second bracket during the vehicle collision.

Specifically, the coupling member can be reliably held by the breakable protrusion when a load is applied thereto at a given value or less, and can reliably break the breakable protrusion when a load is applied thereto at a value of greater than the given value, so as to permit the relative displacements. The guide groove having the front region formed to extend upward allows the steering shaft to be reliably displaced upward.

In the first specific embodiment of the present invention, the breakable protrusion may be formed to hold the coupling member only from an upper side of the guide groove.

According to this structure, a lower edge of the guide groove is not deformed during the vehicle collision. This makes it possible to protect the lower edge of the guide groove so as to ensure a smooth movement of the coupling member during the vehicle collision.

In the first specific embodiment of the present invention, the breakable protrusion may include an upper breakable protrusion and a lower breakable protrusion which are formed to hold the coupling member from both upper and lower sides of the guide groove, and the upper and lower breakable protrusions may be formed to be different in rigidity for holding the coupling member.

According to this structure, the coupling member can be reliably held by both the upper and lower breakable protrusions in the normal state, and can deform and break the breakable protrusions in turn from the lower-rigidity breakable protrusion during the vehicle collision so as to allow the coupling member to smoothly induce the relative displacements.

In a second specific embodiment of the present invention, each of the first and second brackets may be formed with a telescopic-adjustment groove for a telescopic movement of the steering column, and the telescopic-adjustment groove of the first bracket may being extended frontward to form a guide groove for guiding the steering shaft axially and upward during a vehicle collision.

According to this structure, the guide groove can be formed using the telescopic-adjustment groove. Further, the telescopic-adjustment grooves formed in the respective first and second brackets allow the steering column or the steering shaft to be stably supported relative to the instrument-panel member.

In a third specific embodiment of the present invention, the second bracket is formed with a tilt-adjustment groove for a tilt movement of the steering shaft about a tilt center disposed on a frontward side of the vehicle relative to a portion of the first bracket associated with the coupling means.

According to this structure, the above effects of the present invention can be obtained in a steering system equipped with a tilt mechanism.

In the first specific embodiments of the present invention, the groove may be formed in a curved shape continuously extending from a rear end to a frond end thereof.

This structure allows the coupling member to be smoothly moved along the curved-shapes guide groove during the vehicle collision.

In a fourth specific embodiment of the present invention, the coupling means may be designed to limit an amount of the upward displacement of the second bracket to zero or a relatively small value at an initial stage of the axial relative displacement of the second bracket during a vehicle collision, and then increase the amount of the upward relative displacement along with the progress of the axial relative displacement.

According to this structure, the coupling means is operable, in a normal state (in a non-collision state), to couple the first and second brackets together, and, in the event of a vehicle collision, to allow the second bracket to have the axial relative displacement. Further, during the vehicle collision, an amount of the upward displacement of the second bracket is limited to zero or a relatively small value at an initial stage of the axial relative displacement there, and then increased along with the progress of the axial relative displacement.

Thus, a steering operation by a passenger can be assured in a simplified structure. In addition, when the upper body of a passenger is moved frontward with large kinetic energy during a vehicle collision, the steering shaft can be moved substantially in the axial direction to prevent swing movement of the steering wheel so as to reduce shock to be imposed on the passenger. Then, the steering shaft can be displaced upward to prevent the knee of the passenger from interfering with the steering shaft.

In this specific embodiment of the present invention, the coupling means may include a guide groove formed in either one of the first and second brackets to extend upward in a front region thereof on the basis of an axial direction of the steering shaft, and a coupling member slidably supported by the guide groove to couple the first and second bracket together, wherein the guide groove has a tight region located on a rear end side thereof and a loose region extending continuously from the tight region to a front end thereof.

According to this structure, the tight region formed on the rear end side of the guide groove makes it possible to prevent swing movement of the steering wheel in the initial stage of the axial relative displacement. Further, the loose region formed on the front end side of the guide groove makes it possible to reliably displace the steering shaft upward even if a component, such as the bracket, has a deformation due to a vehicle collision.

In the above specific embodiment of the present invention, the loose region may be formed to have a groove width gradually increasing as coming closer to the front end.

According to this structure, the guide groove is designed to have a groove width gradually increasing as coming closer to the front end thereof. Thus, even if a component, such as the bracket, has a deformation due to a vehicle collision, the steering shaft can be further reliably displaced upward.

Further, in the above specific embodiment of the present invention, the tight region may be formed to extend parallel to the axial direction of the steering shaft, and allow the amount of the upward relative displacement of the second bracket to be increased as the amount of the axial relative displacement of the second bracket is increased.

According to this structure, in the initial stage of the axial displacement during the vehicle collision, the steering shaft can be moved directly frontward along the tight region parallel to the axial direction of the steering shaft, so as to prevent swing movement of the steering wheel. Then, the loose region allows the steering shaft to be displaced upward through the second bracket so as to prevent the knee of the passenger from interfering with the steering shaft.

In the fourth specific embodiment of the present invention, the coupling means may include a guide groove formed in either one of the first and second brackets to extend upward in a front region thereof on the basis of an axial direction of the steering shaft, and a coupling member slidably supported by the guide groove to couple the first and second bracket together, wherein the guide groove is formed in a curved shape extending continuously from a rear end to a front end thereof.

This structure allows the coupling member to be smoothly moved along the curved-shapes guide groove during the vehicle collision.

In a fifth specific embodiment of the present invention, the second bracket may be disposed in such a manner as to partly overlap with the instrument-panel member vertically, wherein the structure includes means for crushing a front region of the overlapping portion of the second bracket during interference with the instrument-panel member.

According to this structure, the second bracket is disposed in such a manner as to partly overlap with the instrument-panel member vertically. Thus, a span between the instrument-panel member and the steering shaft can be minimized while allowing each of the instrument-panel member and the steering shaft to be located at an adequate position, so as to facilitate downsizing of the second bracket.

Further, in a normal state (in a non-collision state), the coupling member allows the first and second brackets each arranged at an adequate position as described above to be coupled together so as to ensure a steering operation by a passenger Furthermore, when the second bracket has the axial relative displacement and the upward relative displacement during a vehicle collision, the front region of the overlapping portion of the second bracket is brought into interference with the instrument-panel member and crushed. This is makes it possible to reliably move the second bracket and reliably displace the steering shaft axially and upward so as to prevent the knee of the passenger from interfering with the steering shaft.

As above, this structure makes it possible to reliably displace the steering shaft axially and upward during the vehicle collision while reducing the span between the instrument-panel member and the steering shaft.

In the fifth specific embodiment of the present invention, the crushing means may include a protrusion provided in the instrument-panel member and/or a portion of the first bracket adjacent to the instrument-panel member to protrude toward the second bracket, and the protrusion may be adapted to press the front region of the overlapping portion downward during the interference so as to cause a deformation in the front region.

According to this structure, the front region of the overlapping portion of the second bracket can be reliably pressed downward and deformed by the protrusion. This makes it possible to assure a reliable movement of the second bracket during interference with the instrument-panel member.

In the fifth specific embodiment of the present invention, the crushing means may include a deformation-inducing portion formed in the second bracket and adapted to induce a deformation in the front region of the overlapping portion during interference with the instrument-panel member.

The deformation-inducing portion may be formed of a weakened portion, such as slit or bead.

According to this structure, the front region of the overlapping portion of the second bracket can be further reliably deformed based on the deformation-inducing portion.

As mentioned above, the present invention has an advantage of being able to displace a steering shaft upward in the event of a vehicle collision so as to prevent the knee of a passenger from interfering with the steering shaft, while ensuring a steering operation by a passenger, in a simplified structure.

This application is based on Japanese Patent Application Nos. 2005-043421, 2005-043422, and 2005-043423, filed in Japan Patent Office on Feb. 21, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A structure for supporting a steering device relative to a vehicle body through an instrument-panel member extending a lateral direction of a vehicle, said steering device including a steering shaft adapted to transmit a steering force of a steering wheel to road wheels, said structure comprising:
   a first bracket fixed to said instrument-panel member;
   a steering column rotatably mounting said steering shaft;
   a second bracket fixed to said steering column; and
   coupling means for providing a coupling between said first and second brackets, said coupling means being designed to allow said second bracket an axial relative displacement with respect to said first bracket along an axial direction of said steering shaft while allowing an upward relative displacement of said second bracket with respect to said first bracket along with said axial relative displacement, during a vehicle collision,
   wherein said coupling means includes:
   a guide groove formed in either one of said first and second brackets to extend upward in a front region thereof on the basis of an axial direction of said steering shaft; and
   a coupling member slidably supported by said guide groove to couple said first and second brackets together,
   wherein said guide groove has a breakable protrusion disposed therein and adapted to inhibit said relative displacements in a normal state and to be broken by said coupling member during a vehicle collision so as to permit said relative displacements.

2. The structure as defined in claim 1, wherein said breakable protrusion is formed to hold said coupling member only from an upper side of said guide groove.

3. The structure as defined in claim 1, wherein said breakable protrusion includes an upper breakable protrusion and a lower breakable protrusion which are formed to hold said coupling member from both upper and lower sides of said guide groove, said upper and lower breakable protrusions being formed to be different in rigidity for holding said coupling member.

4. The structure as defined in claim 1 wherein each of said first and second brackets is formed with a telescopic-adjustment groove for a telescopic movement of said steering column, said telescopic-adjustment groove of said first bracket being extended frontward to form a guide groove for guiding said steering shaft axially and upward during a vehicle collision.

5. The structure as defined in claim 1 wherein said second bracket is formed with a tilt-adjustment groove for a tilt movement of said steering column about a tilt center disposed on a frontward side of the vehicle relative to a portion of said first bracket associated with said coupling means.

6. The structure as defined in claim 1, wherein said guide groove is formed in a curved shape continuously extending from a rear to a frond thereof.

7. A structure for supporting a steering device relative to a vehicle body through an instrument-panel member extending a lateral direction of a vehicle, said steering device including a steering shaft adapted to transmit a steering force of a steering wheel to road wheels, said structure comprising:
   a first bracket fixed to said instrument-panel member;
   a steering column rotatably mounting said steering shaft;
   a second bracket fixed to said steering column; and
   coupling means for providing a coupling between said first and second brackets, said coupling means being designed to allow said second bracket an axial relative displacement with respect to said first bracket along an axial direction of said steering shaft while allowing an upward relative displacement of said second bracket with respect to said first bracket along with said axial relative displacement, during a vehicle collision,
   wherein said coupling means is designed to limit an amount of the upward displacement of said second bracket to zero or a relatively small value at an initial stage of the axial relative displacement of said second bracket during a vehicle collision, and then increase the amount of said upward relative displacement along with the progress of said axial relative displacement; and said coupling means includes:
   a guide groove formed in either one of said first and second brackets to extend upward in a front region thereof on the basis of an axial direction of said steering shaft; and
   a coupling member slidably supported by said guide groove to couple said first and second bracket together, wherein said guide groove has a tight region located on a rear end side thereof and a loose region extending continuously from said tight region to a front end thereof.

8. The structure as defined in claim 7, wherein said loose region is formed to have a groove width gradually increasing as coming closer to the front end.

9. The structure as defined in claim 7, wherein said tight region is formed to extend parallel to the axial direction of said steering shaft, and allow the amount of the upward relative displacement of said second bracket to be increased as the amount of the axial relative displacement of said second bracket is increased.

10. A structure for supporting a steering device relative to a vehicle body through an instrument-panel member extending a lateral direction of a vehicle, said steering device including a steering shaft adapted to transmit a steering force of a steering wheel to road wheels, said structure comprising:

a first bracket fixed to said instrument-panel member;

a steering column rotatably mounting said steering shaft;

a second bracket fixed to said steering column; and coupling means for providing a coupling between said first and second brackets, said coupling means being designed to allow said second bracket an axial relative displacement with respect to said first bracket along an axial direction of said steering shaft while allowing an upward relative displacement of said second bracket with respect to said first bracket along with said axial relative displacement, during a vehicle collision, wherein said second bracket is disposed in such a manner as to partly overlap with said instrument-panel member vertically, wherein said structure includes means for crushing a front region of the overlapping portion of said second bracket during interference with said instrument-panel member.

11. The structure as defined in claim 10, wherein said crushing means includes a protrusion provided in said instrument-panel member and/or a portion of said first bracket adjacent to said instrument-panel member to protrude toward said second bracket, said protrusion being adapted to press the front region of said overlapping portion downward during the interference so as to cause a deformation in said front region.

12. The structure as defined in claim 10, wherein said crushing means includes a deformation-inducing portion formed in said second bracket and adapted to induce a deformation in the front region of said overlapping portion during interference with said instrument-panel member.

* * * * *